US007838141B2

(12) United States Patent
Marina et al.

(10) Patent No.: US 7,838,141 B2
(45) Date of Patent: Nov. 23, 2010

(54) CERIUM-MODIFIED DOPED STRONTIUM TITANATE COMPOSITIONS FOR SOLID OXIDE FUEL CELL ANODES AND ELECTRODES FOR OTHER ELECTROCHEMICAL DEVICES

(75) Inventors: Olga A. Marina, Richland, WA (US); Jeffry W. Stevenson, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 12/542,431

(22) Filed: Aug. 17, 2009

(65) Prior Publication Data

US 2010/0009222 A1    Jan. 14, 2010

Related U.S. Application Data

(62) Division of application No. 10/427,866, filed on May 1, 2003, now Pat. No. 7,670,711.

(60) Provisional application No. 60/377,527, filed on May 3, 2002.

(51) Int. Cl.
*H01M 4/00* (2006.01)

(52) U.S. Cl. .......................... 429/40; 429/30

(58) Field of Classification Search .............. 429/29, 429/30, 33, 41, 46, 107, 220
See application file for complete search history.

(56) References Cited

U.S. PATENT DOCUMENTS

| 4,133,778 A | 1/1979 | Gray |
| 4,330,633 A | 5/1982 | Yoshisato et al. |
| 4,562,124 A | 12/1985 | Ruka |
| 4,702,971 A | 10/1987 | Isenberg |
| 4,849,254 A | 7/1989 | Spengler et al. |
| 5,021,304 A | 6/1991 | Ruka et al. |
| 5,106,706 A | 4/1992 | Singh et al. |
| 5,108,850 A | 4/1992 | Carlson et al. |
| 5,342,704 A | 8/1994 | Vasilow et al. |
| 5,474,800 A | 12/1995 | Matsuzaki |
| 5,509,189 A | 4/1996 | Tuller et al. |

(Continued)

FOREIGN PATENT DOCUMENTS

JP    05 235383 A    9/1993

(Continued)

OTHER PUBLICATIONS

Balachandran et al., "Electrical Conductivity in Strontium Titanate," *Journal of Solid State Chemistry* 39:351-359, 1981.

(Continued)

*Primary Examiner*—Patrick Ryan
*Assistant Examiner*—Ben Lewis
(74) *Attorney, Agent, or Firm*—Klarquist Sparkman, LLP

(57) ABSTRACT

The present invention provides novel compositions that find advantageous use in making electrodes for electrochemical cells and electrochemical devices such as solid oxide fuel cells, electrolyzers, sensors, pumps and the like, the compositions comprising cerium-modified doped strontium titanate. The invention also provides novel methods for making and using anode material compositions and solid oxide fuel cells and solid oxide fuel cell assemblies having anodes comprising the compositions.

20 Claims, 20 Drawing Sheets

U.S. PATENT DOCUMENTS

| | | | |
|---|---|---|---|
| 5,686,198 | A | 11/1997 | Kuo et al. |
| 5,759,936 | A | 6/1998 | Christiansen et al. |
| 5,770,326 | A | 6/1998 | Limaye |
| 5,807,642 | A | 9/1998 | Xue et al. |
| 5,932,146 | A | 8/1999 | Kuo et al. |
| 5,993,986 | A | 11/1999 | Wallin et al. |
| 6,120,924 | A | 9/2000 | Chiba et al. |
| 6,248,468 | B1 | 6/2001 | Ruka et al. |
| 6,548,203 | B2 | 4/2003 | Wallin et al. |
| 6,589,680 | B1 | 7/2003 | Gorthe et al. |
| 6,893,762 | B2 | 5/2005 | Sarkar et al. |
| 7,033,470 | B2 | 4/2006 | Mazanec et al. |
| 2002/0015871 | A1* | 2/2002 | Tao et al. ............. 429/27 |
| 2002/0031694 | A1 | 3/2002 | Van Berkel et al. |

FOREIGN PATENT DOCUMENTS

| | | |
|---|---|---|
| WO | WO 00/64814 A | 11/2000 |

OTHER PUBLICATIONS

Balachandran et al., "Electrical Conductivity in Lanthanum-Doped Strontium Titanate," *J. Electrochem. Soc.* 129(5):1021-1026, May 1982.

Chan et al., "Nonstoichiometry in $SrTiO_3$," *J. Electrochem. Soc.* 128(8):1752-1769, Aug. 1981.

Eror et al., "Self-Compensation in Lanthanum-Doped Strontium Titanate," *Journal of Solid State Chemistry* 40:85-91, 1981.

Flandermeyer et al., "Oxidation-reduction behavior in La-Doped $SrTiO_3$," *Journal of Materials Science* 19:2593-2598, 1984.

Frederolse et al., "Electronic Transport in Strontium Titanate," *Physical Review* 134(2A):A442-A445 (Apr. 20, 1964).

Hanajin et al., "EXAFS analyses of $CaTiO_3$ doped with Ce, Nd and U," *Solid State Ionics* 108:343-348, 1998.

Jurado et al., "Impedance spectroscopy of $SR_{0.97}Ti_{1-x}Fe_xO_{3-\delta}$ materials with moderate Fe-contents," *Solid State Ionics* 143:251, 2001.

Kuthy et al., "Low voltage varistors based on $SrTiO_3$ ceramics," *Materials Science and Engineering* B33:58-66, 1995.

Menesklou et al., "High temperature oxygen sensors based on doped $SrTiO_3$," *Sensors and Actuators* B59184-189, 1999.

Middleton et al., "Evaluation of Novel Oxide Anodes for Methane Conversion in SOFC Systems," *Proceedings of the Third International Symposium on Solid Oxide Fuel Cells* 93-4:542-551, 1993.

Pudmich et al., "Characterization of new ceramic anode materials for direct methane oxidation in SOFC," *Electrochemical Society Proceedings* 99(19):577-582, 1999.

Pudmich et al., "Chromite/titanate based perovskites for application as anodes in solid oxide fuel cells," *Solid State Ionics* 135:433-438, 2000.

Slater et al., "Synthesis and electrical characterizations of doped perovskite titanates as potential anode materials for solid oxide fuel cells," *Journal of Material Chemistry* 7(12):2495-2498, Dec. 1, 1997.

Slater et al., "Synthesis and electrical characterization of new anode materials for SOFC," *Proceedings from the Third European Solid Oxide Fuel Cell Forum*, 1:416-426, Jun. 2-5, 1998.

Slater et al., "Niobium based tetragonal tungsten bronzes as potential anodes for solid oxide fuel cells: synthesis and electrical characterization," *Solid State Ionics* 120:125-134, 1999.

Sugimoto et al., Synthesis and structures of carrier doped titanates with the Ruddlesden—Popper structure $(Sr_{0.95}La_{0.05})_{n+1}Ti_nO3_{3n+1}$ (n=1, 2), *Solid State Ionics* 108:315-319, 1998.

Sumathy et al., "Selective oxidation and dehydrogenation of benzyl alcohol on $Abb'O_3$ (a=Ba, B-Pb, Ce, Ti and B'=Bi, Cu, Sb)-type perovskite oxides-temperature programmed reduction studies," *Applied Catalysis A: General* 172:15-22, 1998.

Sunstrom IV et al., "Synthesis structure and properties of LA1-XSRXT103 (0<X<1)," *Chemistry of Materials* 4(2):346-353, Apr. 1, 1992.

Sutija et al., "Measurements of the Electrical Conductivity of Iron-doped Calcium Titanate," *Proceedings of the Third International Symposium on Solid Oxide Fuel Cells* 93-4:552-561, 1993.

Tufte et al., "Electron Mobility in Semiconducting Strontium Titanate," *Physical Review* 155(3):796-802, Mar. 15, 1997.

Yahia et al., "Electrical Conduction in p-Type Titanium Sesquioxide," *Physical Review* 123(4):1257-1261, Aug. 15, 1961.

Yamamoto et al., "Perovskite-type oxides as oxygen electrodes for high temperature oxide fuel cells," *Solid State Ionics* 22:241-246, 1987.

Yashiro et al., "Electrochemical Properties of Oxide Anode Materials for SOFC," *Electrochemical Society Proceedings* 16:678-683, 2001.

Zhang et al., "Doped Strontium titanate current liquid and preparation method," *Physics Inst., Chinese Academy of Sciences* vol. 128, No. 2, 1997 (Abstract).

* cited by examiner

CERIUM-MODIFIED DOPED STRONTIUM TITANATE COMPOSITIONS FOR SOLID OXIDE FUEL CELL ANODES AND ELECTRODES FOR OTHER ELECTROCHEMICAL DEVICES

REFERENCES TO RELATED APPLICATIONS

This application is a divisional of U.S. patent application Ser. No. 10/427,866, filed May 1, 2003, now U.S. Pat. No. 7,670,711 which claims the benefit of U.S. Provisional Application No. 60/377,527, filed May 3, 2002, each of which is hereby incorporated by reference herein in their entireties.

GOVERNMENT RIGHTS

This invention was made with Government support under Contract Number DE-AC0676RLO1830 awarded by the U.S. Department of Energy. The Government has certain rights in the invention.

BACKGROUND OF THE INVENTION

The present invention relates to novel oxide electrode materials comprising cerium-modified doped strontium titanate and methods for making and using same. Oxide electrode materials in accordance with the invention find advantageous use in solid oxide electrolyte electrochemical devices such as, for example, solid oxide fuel cells, electrolyzers, electrochemical sensors and the like.

As a background to the invention, electrochemical devices based on solid oxide electrolytes have received, and continue to receive, significant attention. For example, electrochemical fuel cell devices are believed to have significant potential for use as power sources. In addition, electrolyzers have received significant attention for the production of hydrogen from water.

Fuel cell devices are known and used for the direct production of electricity from standard fuel materials including fossil fuels, hydrogen, and the like by converting chemical energy of a fuel into electrical energy. Fuel cells typically include a porous anode, a porous cathode, and a solid or liquid electrolyte therebetween. In operation, gaseous fuel materials are contacted, typically as a continuous stream, with the anode (also referred to as the "fuel electrode") of the fuel cell system, while an oxidizing gas, for example air or oxygen, is allowed to pass in contact with the cathode (also referred to as the "air electrode") of the system. Electrical energy is produced by electrochemical combination of the fuel with the oxidant. Because the fuel cells convert the chemical energy of the fuel directly into electricity without the intermediate thermal and mechanical energy step, their efficiency is substantially higher than that of conventional methods of power generation.

Solid oxide fuel cells (SOFCs) employing a dense ceramic electrolyte are currently considered as one of the most attractive technologies for electric power generation. In a typical SOFC, a solid electrolyte separates the porous metal-based anode from a porous metal or ceramic cathode. Due to its mechanical, electrical, chemical and thermal characteristics, yttria-stabilized zirconium oxide (YSZ) is currently the electrolyte material most commonly employed. At present, the anode in a typical SOFC is made of nickel-YSZ cermet, and the cathode is typically made of doped lanthanum manganites, lanthanum ferrites or lanthanum cobaltites. In such a fuel cell, an example of which is shown schematically in FIG. 1, the fuel flowing to the anode reacts with oxide ions to produce electrons and water. The oxygen reacts with the electrons on the cathode surface to form oxide ions that migrate through the electrolyte to the anode. The electrons flow from the anode through an external circuit and then to the cathode. The movement of oxygen ions through the electrolyte maintains overall electrical charge balance, and the flow of electrons in the external circuit provides useful power.

Because each individual electrochemical cell made of a single anode, a single electrolyte, and a single cathode generates an open circuit voltage of about one volt and each cell is subject to electrode activation polarization losses, electrical resistance losses, and ion mobility resistant losses which reduce its output to even lower voltages at a useful current, a fuel cell assembly comprising a plurality of fuel cell units electrically connected to each other to produce the desired voltage or current is required to generate commercially useful quantities of power.

Limited by the conductivity of YSZ, SOFCs typically operate at high temperatures, such as, for example, 650-1000° C. This allows flexibility in fuel choice and results in suitable fuel-to-electricity and thermal efficiencies; however, high temperatures impose stringent requirements on the materials selection for other components of the fuel cell or fuel cell assembly.

The material used as an SOFC anode must possess a high electronic or preferably mixed ionic and electronic conductivity. It must also exhibit sufficient catalytic activity towards the reaction proceeding on the electrode surface to minimize polarization losses. Also necessary are adequate porosity for gas transport, and good chemical and mechanical compatibility with the electrolyte and interconnect. In addition, the anode must be thermally stable, i.e., stable over a wide range of temperatures. Another desirable feature is that an anode should be stable over a rather wide range of oxygen partial pressures ($pO_2$), such as, for example, in the low oxygen partial pressure prevalent in the fuel gas inlet as well as in the more oxidizing conditions (high oxygen partial pressure) at the fuel outlet. Furthermore, if the SOFC is to operate on unreformed hydrocarbons, the anode should also possess a high catalytic activity for hydrocarbon oxidation without carbon deposition. When combined with fabrication considerations, these requirements make the development of suitable new anode materials a challenging task.

As stated above, for SOFCs with a YSZ electrolyte, a nickel-YSZ cermet is currently the favored anode material. Properties of nickel-based composite anodes have been profoundly investigated, and their reliability and robustness for stationary power applications has been established over a long-term operation on clean pre-reformed fuel (hydrogen). However, additional constraints must be placed on the anode material in order to economically bring SOFC technology into more advanced designs including, for example, power sources for motor vehicles and auxiliary power units, and other applications that involve intermittent power demands, intermittent usage and nonusage, and thus repeated heating and cooling cycles. In particular, for applications requiring frequent thermal cycling, anode stability in oxidizing conditions at high temperatures is necessary. In this regard, during system heat-up and cool-down, an anode that is tolerant of oxidizing environments withstands thermal cycling without the need for protecting the anode by hermetic sealing or flowing of an inert or reducing gas.

Due to the high nickel content of Ni-YSZ (typically around 40 vol % nickel) or other nickel-based composite materials, and the ease with which nickel is oxidized into nickel oxide in oxidizing atmospheres, conventional nickel-based anodes suffer structural damage when cycled without a protective atmosphere. In this regard, a state-of-the-art Ni-YSZ anode maintains suitable functionality only until the anode is contacted with air, whereupon functionality is lost, and the anode is irreversibly damaged. It is believed that upon contact with air nickel is oxidized into nickel oxide, which is much larger than Ni. Because it is larger, the increase in size during the oxidation process causes the fuel cell structure to fracture, with various layers being pushed up and aside, thus causing fractures in the stack. This also causes the nickel anode to delaminate from YSZ due to the different thermal expansion of NiO and YSZ.

In addition, when exposed to hydrocarbon fuel at a steam-to-carbon ratio lower than 2-3, a nickel-based anode promotes carbon deposition on its surface, which is believed to block electrocatalytically active sites, causing the adverse loss of anode activity. Carbon has also been shown to mechanically destroy the functionality of the anode, and thus of the fuel cell as a whole.

Another requirement of steady operation of a fuel cell having a nickel-based anode is removal of sulfur-bearing impurities from the fuel, such as, for example, removal of $H_2S$, which is frequently present in hydrocarbon fuels. Even $H_2S$ levels as low as 1-2 parts per million (ppm) detrimentally affect the SOFC performance by forming nickel sulfide scales on the anode, which is eventually followed by disintegration of the anode. While Ni-YSZ anode is satisfactory for conventional SOFCs operating under carefully controlled conditions as described above, advanced SOFC designs require the development of anode materials having improved properties, such as, for example, tolerance of highly oxidizing environments and/or the capability of utilizing hydrocarbon fuels without carbon deposition and/or resistance to sulfur fouling.

In view of the above background, it is apparent that there is a continuing need for further developments in the field of SOFC technology. In particular, there is a need for further advancement in the development of alternative anode materials having suitable properties for use in advanced SOFC designs. There is also a need for further advancement in the development of other alternative electrochemical devices, such as, for example, electrolyzers, electrochemical sensors and the like. The present invention addresses these needs, and further provides related advantages.

SUMMARY OF THE INVENTION

Accordingly, it is one object of this invention to provide novel oxide electrode materials suitable for use in solid oxide fuel cells and other electrochemical devices with solid oxide electrolytes.

It is another object of this invention to provide electrochemical devices with solid oxide electrolytes and their assemblies that include electrode materials provided by the present invention.

It is another object of the invention to provide novel methods for making and using oxide electrodes.

These and other objects are achieved by the present invention, which provides cerium-modified doped strontium titanate materials suitable for use in solid oxide fuel cells and other electrochemical devices.

The present invention also provides solid oxide fuel cells, solid oxide fuel cell assemblies and other electrochemical devices that include cerium-modified doped strontium titanate materials provided by the present invention.

The present invention also provides novel methods for making and using the cerium-modified doped strontium titanate materials.

Further forms, embodiments, objects, features, and aspects of the present invention shall become apparent from the description contained herein.

BRIEF DESCRIPTION OF THE FIGURES

Although the characteristic features of this invention will be particularly pointed out in the claims, the invention itself, and the manner in which it may be made and used, may be better understood by referring to the following description taken in connection with the accompanying figures forming a part hereof.

DESCRIPTION OF THE PREFERRED EMBODIMENTS

Figure 1:
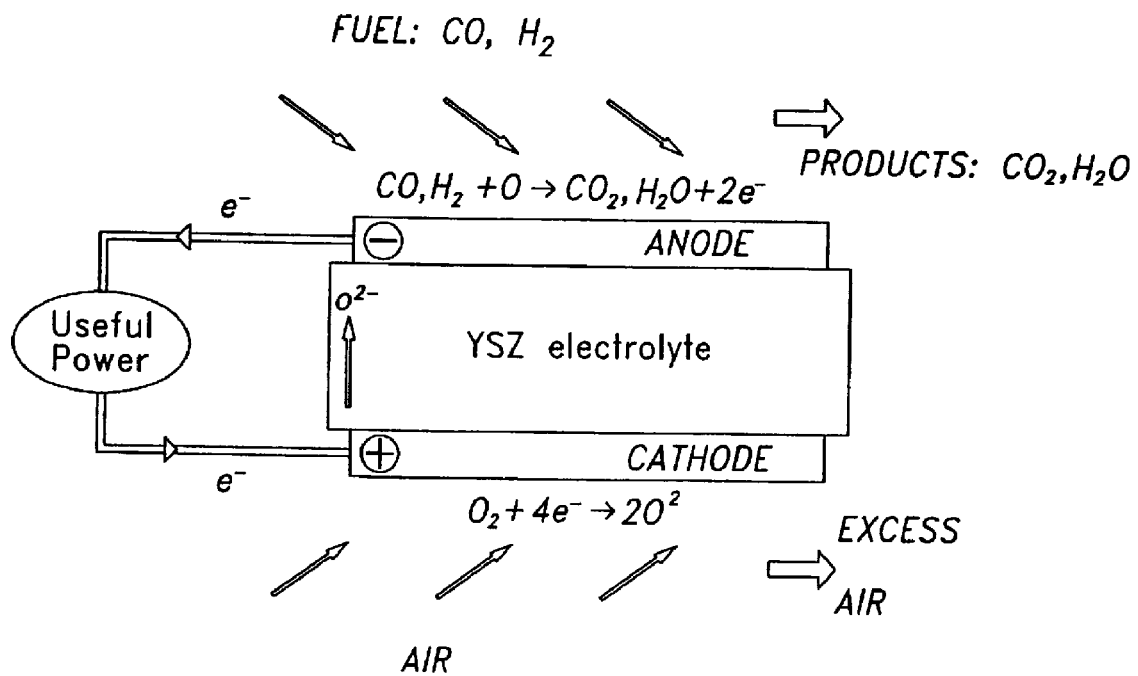
FIG. 1 depicts a general schematic diagram showing the function of a solid oxide fuel cell.

For the purpose of promoting an understanding of the principles of the invention, reference will now be made to preferred embodiments and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present invention provides novel compositions that find advantageous use in making oxide electrode materials for solid oxide electrochemical devices such as, for example, electrodes for electrolyzers, electrodes for electrochemical sensors and anodes for solid oxide fuel cells. The invention also provides novel methods for making electrodes for electrochemical devices and electrochemical devices and assemblies having electrodes comprising inventive compositions. The invention is described herein primarily by reference to solid oxide fuel cell (SOFC) technology, and a variety of examples are provided herein showing advantageous features and characteristics of the invention in relation to SOFC technology; however, it is not intended that the invention be limited to use in connection with SOFC devices.

It is well known to a person of ordinary skill in the relevant field that a SOFC can have a wide variety of configurations, including, for example and without limitation, a planar (also referred to as "flat plate") configuration, a tubular configuration and a corrugated configuration. It is to be understood that SOFC anode materials provided by the present invention can be advantageously used in a wide variety of SOFC configurations, and such are within the scope of the invention.

In one aspect, the invention provides a cerium-modified doped strontium titanate composition for use as an anode material for a SOFC. The cerium-modified doped strontium titanate anode composition comprises a perovskite crystal structure that includes at least an A-site dopant, and which is modified by the incorporation of cerium therein to provide a cerium-modified doped strontium titanate. The term "dopant" as used herein refers to a substance that is included in the chemical structure of the strontium titanate perovskite. As used herein, the term "cerium-modified" is intended to mean that the doped strontium titanate composition has cerium included therein in some form. While it is not intended that the invention be limited by any theory whereby it achieves its advantageous result, it is believed that the cerium is incorporated into the composition either (1) as a B-site dopant, wherein cerium atoms replace titanium atoms in the "B-site" of the perovskite crystal structure, (2) as cerium oxide or compounds of cerium oxide in a separate phase, thereby forming a composite including a cerium oxide phase and a perovskite structure phase, or (3) as a combination of (1) and (2), in which some of the cerium enters the perovskite crystal structure as a B-site dopant and some of the cerium forms a separate phase as a cerium oxide or compounds of cerium oxide phase. Based upon the results of performed laboratory work, it is believed that item (3) above best describes the manner in which cerium is incorporated into the doped strontium titanate; however, it is not intended that the invention be limited by this theory. For purposes of describing the present invention, the term "cerium-modified doped strontium titanate" is intended to encompass doped strontium titanate compositions modified by the addition of cerium irrespective of the location of the cerium in the composition.

For purposes of describing the invention, the amount of cerium included in an inventive composition is described in terms of atomic percent (at. %), which is designated herein by the variable "y". The term "atomic percent" as used herein refers to the atomic ratio of cerium in the composition to titanium atoms present in the composition prior to cerium modification. As described in the Examples, inventive compositions can be made by glycine/nitrate combustion method, or can alternatively be made using other methods as would occur to a person of ordinary skill in the art, such as, for example, the Pechini method. The present invention also contemplates the modification of a doped or undoped strontium titanate with a mixture of cerium and one or more transition metals, such as, for example, nickel, cobalt, copper, chromium or iron.

With respect to the possible incorporation of some or all of the cerium into the perovskite structure as a B-site dopant, the perovskite crystal structure of an A-site and B-site-doped perovskite is represented by the general formula:

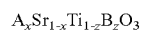

(referred to herein as "Formula 1"), where each of x and z is a value between zero and one. In Formula 1, A can include, for example, an A-site dopant selected from the group consisting of lanthanum, scandium, yttrium and combinations thereof. To the extent that cerium is present as a B-site dopant in an inventive composition, B comprises cerium, a combination of cerium with any one or more of nickel, cobalt, copper, chromium or iron or a combination of cerium with one or more other dopants. A person of ordinary skill in the art will appreciate that, in a composition in which the B-site dopant is cerium, the perovskite structure of the composition can be represented by the formula:

(referred to herein as "Formula 2"). A person of ordinary skill in the art will also understand that the relative amounts of A and B as dopants in a strontium titanate perovskite structure is limited by the "solubility" of the dopants in the crystal structure. In certain embodiments, "x" in Formula 1 and Formula 2 is a nonzero value up to about 0.4 and each of "z" in Formula 1 and "y" in Formula 2 is a value up to about 0.8. One or both of the A-site dopant and the B-site dopant in a doped strontium titanate perovskite composition can be a mixture of a plurality of suitable dopant materials. For example, where the perovskite composition includes a mixture of two A-site dopants and a mixture of two B-site dopants, the composition comprises a perovskite crystal structure that can be represented by the general formula:

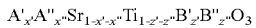

(referred to herein as "Formula 3"), where A' and A" are different A-site dopants in the composition and B' and B" are different B-site dopants in the composition. In this formula, the sum of x' and x" is a value between zero and 1 and the sum of z' and z" is a value between zero and one. It is of course not intended that the invention be limited to compositions having one or two A-site and/or B-site dopants. Rather, Formula 3 is provided as a non-limiting example of a composition including multiple A-site and B-site dopants.

With respect to the formation of a separate phase including some or all of the cerium, a composition including at least an oxide phase and a perovskite structure phase is contemplated. In a multi-phase composite composition, an oxide phase comprising cerium oxide or compound and possibly other oxides is present, in addition to the perovskite crystal structure. It is, of course, not intended that the invention be limited to the location of the cerium in the compositions, and it is contemplated that the cerium may be present in an inventive composition as a B-site dopant, as a separate oxide phase or as a combination thereof, as stated above.

In one embodiment of the invention, wherein a cerium-modified doped strontium titanate material is formed using a mixture of cerium and one or more transition metals, at least about 5% of the mixture is cerium. In another embodiment, at least about 25% of the mixture is cerium. In yet another embodiment, at least about 50% of the mixture is cerium. In still another embodiment, at least about 75% of the mixture is cerium. Cerium-modified doped strontium titanate compositions of a wide variety of formulas in accordance with the invention can be made by providing a mixture, preferably a homogenous mixture, of cerium and one or more transition metals or other dopants for making a strontium titanate composition as described herein.

In one preferred embodiment of the invention, a cerium-modified doped strontium titanate composition is provided in which the cerium content is at least about 2 atomic percent (at. %). In another embodiment, the cerium content is from about 2 to about 50 at. %. In still another embodiment, the cerium content is at least about 5 at. %. One preferred composition in accordance with the invention is a cerium-modified lanthanum-doped strontium titanate. In one embodiment, lanthanum dopant is present in the perovskite crystal structure in an amount up to about 40 at. % (wherein "at. %" for lanthanum, or other A-site dopant, is defined as the atomic ratio of lanthanum in the composition to strontium atoms present in the composition) and cerium is present in an amount up to about 80 at. %. In another embodiment of the invention, lanthanum is present in an amount up to about 40 at. % and cerium is present in an amount up to about 50 at. %. In another embodiment, lanthanum is present in an amount from about 10 at. % to about 40 at. % and cerium is present in an amount from about 10 at. % to about 20 at. %. In yet another embodiment, lanthanum is present in an amount of about 35 at. % and cerium is present in an amount up to about 80 at. %. In still another embodiment, lanthanum is present in an amount of about 35 at. % and cerium is present in an amount of about 10 at. %. In yet another embodiment, lanthanum is present in an amount of about 35 at. % and cerium is present in an amount of about 20 at. %. Scandium and yttrium can also be used as the A-site dopant, either alone or together with lanthanum.

In a further embodiment of the invention, a cerium-modified strontium titanate composition is provided that has thermal expansion characteristics that correspond to thermal expansion characteristics of a preselected solid oxide electrolyte material, such as, for example, a doped zirconia, a doped ceria, a doped lanthanum gallate or a doped bismuth oxide. In one embodiment, a cerium-modified strontium titanate composition is provided that has a coefficient of thermal expansion of from about $8\times10^{-6}$ to about $13\times10^{-6}$ $K^{-1}$. In another embodiment, a cerium-modified strontium titanate composition is provided that has a coefficient of thermal expansion of from about $9\times10^{-6}$ to about $11.5\times10^{-6}$ $K^{-1}$. In yet another embodiment, a cerium-modified strontium titanate composition is provided that has a coefficient of thermal expansion of from about $9.5\times10^{-6}$ to about $1\times10^{-6}$ $K^{-1}$.

In another embodiment of the invention, a cerium-modified strontium titanate composition is provided that has a polarization resistance at 850° C. of no greater than about 10 $\Omega cm^2$. In another embodiment, a composition is provided that has a polarization resistance at 850° C. of no greater than about 5 $\Omega cm^2$. In another embodiment, the composition has a polarization resistance at 700° C. of no greater than about 10 $\Omega cm^2$. In another embodiment, the composition has a polarization resistance at 700° C. of no greater than about 5 $\Omega cm^2$. In a preferred embodiment, the composition exhibits a polarization resistance at 850° C. of about 0.2 $\Omega cm^2$ and a polarization resistance at 700° C. of about 1.3 $\Omega cm^2$ in wet hydrogen versus Pt/air.

In another embodiment, a cerium-modified strontium titanate composition is provided that is characterized in that performance of the composition as an anode material for a solid oxide fuel cell does not vary more than about 5% for at least 200 hours under at least one condition selected from the group consisting of (1) a plurality of intermittent oxidation-reduction cycles, (2) a plurality of thermal cycles, (3) intermittent exposure to hydrogen sulfide, and (4) exposure to gaseous hydrocarbons. In another embodiment, performance of the composition as an anode material for a solid oxide fuel cell does not vary more than about 2% for at least 200 hours under at least one of these conditions. In still another embodiment, performance of the composition as an anode material for a solid oxide fuel cell does not vary more than about 1% for at least 200 hours under at least one of these conditions. For purposes of determining variations in performance as an anode material for a solid oxide fuel cell, it is understood that performance measurements are taken under like conditions. Thus, for purposes of determining a composition's ability to withstand oxidation-reduction cycles, thermal cycles, hydrogen sulfide exposure, exposure to gaseous hydrocarbons and the like, it is understood that performance measurements are taken under like conditions before and after periods of such cycles or exposure.

A cerium-modified doped strontium titanate material can be made in accordance with the invention by glycine/nitrate combustion method from a combination of ingredients, as is well within the purview of a person of ordinary skill in the art. For example, when making a cerium-modified lanthanum-doped strontium titanate material, nitrates of Sr, Ce, La, and a Ti-containing compound can be mixed in predetermined proportions with, for example, glycine and combusted to produce a powder comprising the cerium-modified lanthanum-doped strontium titanate. As an alternative to the glycine/nitrate combustion method, it is also contemplated that inventive compositions can be made using a "solid state reaction method" from starting materials in oxide or salt form at high temperature. As another example, inventive compositions can be made using the Pechini method, as described in U.S. Pat. No. 3,330,697. In this method, oxides and nitrates are complexed in an aqueous solution with citric acid and heated with ethylene glycol. It is, of course, understood that these methods are provided solely as examples of ways to make inventive compositions, and it is not intended that the invention be limited thereby. A person of ordinary skill in the art will also appreciate that, to the extent that cerium is present in the material as an oxide phase, the oxide phase can be prepared separately from a doped or undoped strontium titanate material, and then mixed in a finely-divided form with the strontium titanate material. In this respect, it is preferred that the materials are well mixed to provide a mixture having a high degree of chemical homogeneity.

A cerium-modified doped strontium titanate material made or selected in accordance with the invention can be formed into a solid oxide fuel cell anode or an electrode for other types of electrochemical devices. A doped strontium titanate solid oxide fuel cell anode can be made in accordance with one aspect of the invention by providing an electrolyte substrate and applying to the electrolyte substrate an anode layer comprising a composition selected in accordance with the invention. A fuel cell made in such a manner is referred to as an "electrolyte-supported" cell. The cell also includes a cathode layer positioned in contact with the electrolyte layer opposite the anode layer. The cathode layer can be applied to the electrolyte layer either before or after the anode layer is applied. It is also recognized that the cathode layer can provide the support substrate in some manufacturing protocols for making fuel cells according to some designs. In such a protocol, electrolyte layer is applied to a cathode substrate, and then an anode layer is applied to the electrolyte/cathode component adjacent the electrolyte layer. Such an embodiment is referred to herein as a "cathode-supported cell." In other embodiments, particularly in methods for making fuel cells having a tubular construction, a porous inert substrate can be provided upon which each of the cathode, electrolyte and anode layers is sequentially applied.

Figure 2:
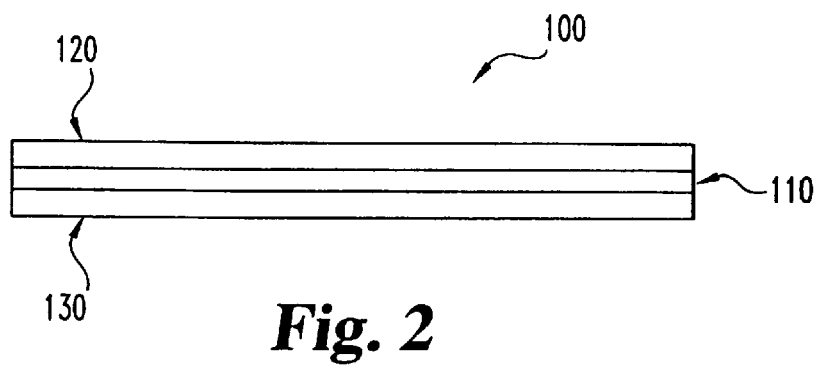
FIG. 2 is a schematic diagram of an embodiment of a fuel cell in accordance with the invention.

When the cerium-modified doped strontium titanate material is made by the glycine/nitrate combustion method, the SOFC anode is made by calcining the cerium-modified doped strontium titanate material to provide a calcined material and mixing the calcined product with a binder to provide an anode ink. In one embodiment, the calcined material is ground before it is mixed with the binder. For example, the calcined material can be ground to an average particle size of up to about 2 microns. Alternatively, an average particle size of up to about 0.5 microns is used. The grinding can be accomplished by attrition milling. In one embodiment, the grinding is achieved by powder milling the calcined mixture with media at about 500 to about 600 rpm in a 3-roll mill to an average particle size of no greater than about 0.5 microns to provide an intermediate product; drying the intermediate product; and passing the intermediate product through a screen to provide the ground product. The screen can have a mesh size of, for example, from about 200 to about 400 mesh. In a preferred method, the screen has a mesh size of about 325 mesh. The anode ink is then applied to a solid oxide electrolyte component and sintered to provide a SOFC anode. As stated above, a cathode layer can be applied to the opposite side of the solid oxide electrolyte either before of after application and sintering of the anode ink. The fuel cell thus has a three-layer configuration as shown schematically in FIG. 2, in which fuel cell 100 includes electrolyte layer 110, anode layer 120 and cathode layer 130.

A wide variety of binders can be selected for use in accordance with the invention to make an anode ink, many of which are available commercially. In one embodiment of the invention, the binder is a screen-printing binder, such as, for example, BX-18, which is commercially available from Ferro Corporation. When a screen-printing binder is used, the anode ink can be conveniently applied to a solid oxide electrolyte component by a screen printing process. Screen printing processes, and equipment that can be used therefore, are well known in the art. It is, of course, not intended that the invention be limited to screen-printing applications. In other embodiments, the anode ink can be applied to a solid oxide electrolyte component by painting, spraying, dip coating, spattering or sedimentation. In addition, the anode ink can be provided in a variety of alternative forms, including, for example, as slurries, liquid suspensions, pastes and others.

Sintering the anode ink can be performed in air, in an inert gas or in a reducing environment. In one embodiment, the sintering is performed at a temperature of from about 850° C. to about 1300° C. In one aspect of the present invention, the sintering the anode ink is carried out in a reducing environment. It is well within the purview of a person of ordinary skill in the art to select and use a wide variety of reducing gases to provide the reducing environment. In one embodiment, the reducing environment comprises hydrogen or an inert gas and hydrogen. If the reducing environment comprises an inert gas and hydrogen, the hydrogen preferably has a concentration of from about 2 to about 100 vol %. In one embodiment, the inert gas comprises argon. It is of course not intended that the invention be limited to these exemplary gases, and it is well within the purview of a person of ordinary skill in the art to select other gases suitable for providing the reducing atmosphere.

In one embodiment, a layer of cerium-modified doped strontium titanate material in a fuel cell in accordance with the invention has a thickness of at least 3 microns. In another embodiment, the layer of cerium-modified doped strontium titanate material has a thickness of at least about 5 microns. In yet another embodiment, the layer of cerium-modified doped strontium titanate material has a thickness of at least about 10 microns. When forming an electrolyte-supported, cathode-supported or inert material-supported cell, the layer of cerium-modified doped strontium titanate material can advantageously have a thickness of from about 10 to about 50 microns.

In alternative embodiments of the invention, a doped strontium titanate solid oxide fuel cell can be made by first providing an anode substrate and then applying an electrolyte layer to the anode substrate. A fuel cell made in such a manner is referred to as an "anode-supported" cell. As one example, a fuel cell can be formed from the cerium-modified doped strontium titanate material prepared or selected in accordance with the invention by forming a "free-standing" anode from the material, applying a solid oxide layer to the anode substrate and then applying a cathode layer to the solid oxide layer, such as, for example, by screen printing or other deposition technique to provide an anode-electrolyte-cathode fuel cell. In one embodiment, the material is ground before forming the anode. For example, the material is ground in one embodiment to an average particle size of about 2 microns or less. In another embodiment, the material is ground to an average particle size of about 0.5 microns or less. In other embodiments, larger particle sizes, or mixtures of relatively fine and relatively course particles are used.

In this manner of making an electrochemical cell, an anode substrate is independently formed, for example, by tape casting, tape calendering or other method that would occur to a person of ordinary skill in the art, and an electrolyte layer is applied to the anode substrate, such as, for example, by painting, spraying, dip coating, spattering or sedimentation. With respect to anode-supported cell embodiments, in one embodiment, the anode layer has a thickness of at least about 50 microns. In yet another embodiment, the anode layer has a thickness of from about 50 microns to about 1 mm. The electrolyte layer can have a wide variety of thicknesses, ranging, for example, from about 1 micron to about 500 microns. In one preferred embodiment, the electrolyte layer has a thickness of from about 1 to about 20 microns.

In one aspect of the invention, therefore, there is provided an integral solid oxide fuel cell for electrochemically reacting a fuel gas with an oxidant gas at an elevated temperature to produce a DC output voltage. The solid oxide fuel cell includes a layer of ceramic ion conducting electrolyte defining first and second opposing surfaces; a conductive anode layer in contact with the first surface of the electrolyte layer; and a conductive cathode layer in contact with the second surface of the electrolyte layer. The anode layer comprises a cerium-modified doped strontium titanate anode material selected in accordance with the present invention. In one embodiment, the cerium-modified doped strontium titanate anode material forms essentially the entire anode layer.

In other embodiments, the anode can include a combination of an inventive cerium-modified doped strontium titanate anode material and another material, such as, for example, an additional conducting material or the like. In one embodiment, the respective materials are formed into discreet sublayers to form the anode layer. For example, the anode can be formed by placing a sublayer of cerium-modified doped strontium titanate anode material adjacent a solid oxide electrolyte and then forming a second sublayer of a second material over the cerium-modified doped strontium titanate anode material. Alternatively, the anode can be formed by applying the second material adjacent the solid oxide electrolyte and then applying the cerium-modified doped strontium titanate anode material thereover. In another embodiment, the anode layer comprises a substantially homogenous mixture of a cerium-modified doped strontium titanate material made or selected in accordance with the invention and a finely-divided form of another material, such as, for example, a conductive material.

In one embodiment, the cerium-modified doped strontium titanate material comprises at least about 75% of the anode, measured by thickness, by volume percent or by mass percent. In another embodiment, the cerium-modified doped strontium titanate material comprises at least about 50% of the anode. In yet another embodiment, the cerium-modified doped strontium titanate material comprises at least about 25% of the anode. In certain preferred embodiments, the cerium-modified doped strontium titanate material is in direct contact with the electrolyte.

In one embodiment of the invention, the cerium-modified doped strontium titanate has thermal expansion characteristics that correspond to thermal expansion characteristics of the electrolyte layer. In another embodiment, the cerium-modified doped strontium titanate has a coefficient of thermal expansion of from about $8 \times 10^{-6}$ to about $13 \times 10^{-6}$ K$^{-1}$.

The fuel cell having an anode comprising a cerium-modified doped strontium titanate material selected in accordance with the invention can have a wide variety of configurations, including, for example and without limitation, a planar fuel cell, a tubular fuel cell or a corrugated fuel cell. As a person of ordinary skill in the art will appreciate, with respect to planar SOFC designs, multiple electrochemical cells are typically positioned adjacent one another in series to form a stack. For example, planar solid oxide fuel cell stacks typically comprise a plurality of stacked cathode-electrode-anode-interconnect repeat units with an electrical interconnect between the cathode and the anode of adjacent cells. The fuel cell assembly also includes ducts or manifolding to conduct the fuel and oxidant into and out of the stack. Channels for gas flow, either in a cross-flow or a co-flow or a counterflow configuration, are usually incorporated into the cathode, anode and/or interconnect. Further information pertaining to various configurations that can advantageously be used in connection with the present invention is provided in connection with U.S. Patent Application filed Apr. 26, 2002 entitled MULTI-LAYER SEAL FOR ELECTROCHEMICAL DEVICES, which is hereby incorporated herein by reference in its entirety.

With respect to tubular SOFC designs, conventional tubular SOFCs typically include an interior ceramic air electrode, or cathode, in the form of a porous tube made of doped lanthanum manganite. Some tubular SOFC designs also include a porous support tube on the interior of the cathode, which provides structural support for the tubular fuel cell, and also provides a substrate upon which other layers of the cell can be deposited during cell fabrication. The outer surface of the air electrode is mostly covered by a solid electrolyte material, typically made of YSZ. The outer surface of the solid electrolyte is covered by a cermet fuel electrode, or anode. In use of a tubular SOFC device, air or oxygen is caused to flow through the center of the tube and a gaseous fuel is caused to contact the anode on the outside of the tube.

It is, of course, understood that there are many design possibilities for fuel cells within these and other categories. Examples of different configurations are provided, for example, in U.S. Pat. No. 5,993,986 to Wallin et al., U.S. Pat. No. 6,106,967 to Virkar et al., U.S. Pat. No. 5,238,754 to Yasuo et al., U.S. Pat. No. 4,997,726 to Akiyama et al., U.S. Pat. No. 4,761,349 to McPheeters et al., U.S. Pat. No. 5,827,620 to Kendall, U.S. Pat. No. 6,248,468 to Ruka et al., U.S. Pat. No. 5,258,240 to Di Croce et al., U.S. Pat. No. 5,932,146 to Kuo et al. and U.S. Pat. No. 4,849,254 to Spengler et al., each of which is hereby incorporated by reference herein. It is, of course, not intended that the invention be limited to these exemplary configurations. The present invention contemplates the use of inventive anode materials in all such fuel cell configurations now known or later developed, without limitation to particulars of the design. In a preferred embodiment, the fuel cell is a planar fuel cell.

Figure 3:
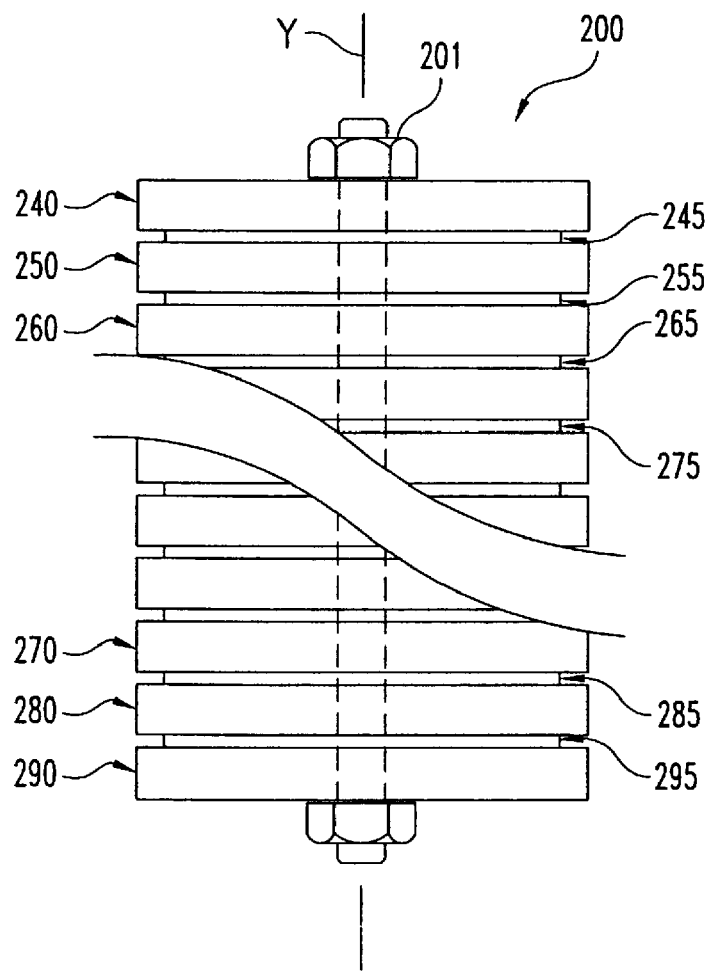
FIG. 3 is a schematic diagram of an embodiment of an electrochemical device of the invention.

In one aspect of the invention, depicted schematically in FIG. 3, an inventive fuel cell is incorporated in a fuel cell assembly 200 that includes a plurality of solid oxide fuel cells 240, 250, 260, 270, 280, 290. The individual cells are separated by seals 245, 255, 265, 275, 285, 295 and potentially one or more additional structures (not shown), such as, for example, conductive interconnects, gas flow components and the like. One embodiment of the invention is a solid oxide fuel cell assembly for electrochemically reacting a fuel gas with a flowing oxidant gas at an elevated temperature to produce a DC output voltage, the assembly including a plurality of integral fuel cell units 240, 250, 260, 270, 280, 290, wherein each unit comprises a layer of ceramic ion conducting electrolyte disposed between and in contact with a conductive anode layer and a conductive cathode layer as described above, and wherein at least one unit includes a conductive anode layer comprising an inventive anode material as described herein. The assembly also preferably includes a system for passing a gaseous fuel in contact with said anode layers and passing an oxidizing gas in contact with said cathode layers (not shown); and a system for utilizing electrical energy produced by said fuel cells (not shown).

Reference will now be made to specific examples illustrating various preferred embodiments of the invention as described above. It is to be understood, however, that the examples are provided to illustrate preferred embodiments and that no limitation to the scope of the invention is intended thereby.

Example One

General Experimental Set-Up

Figure 4:
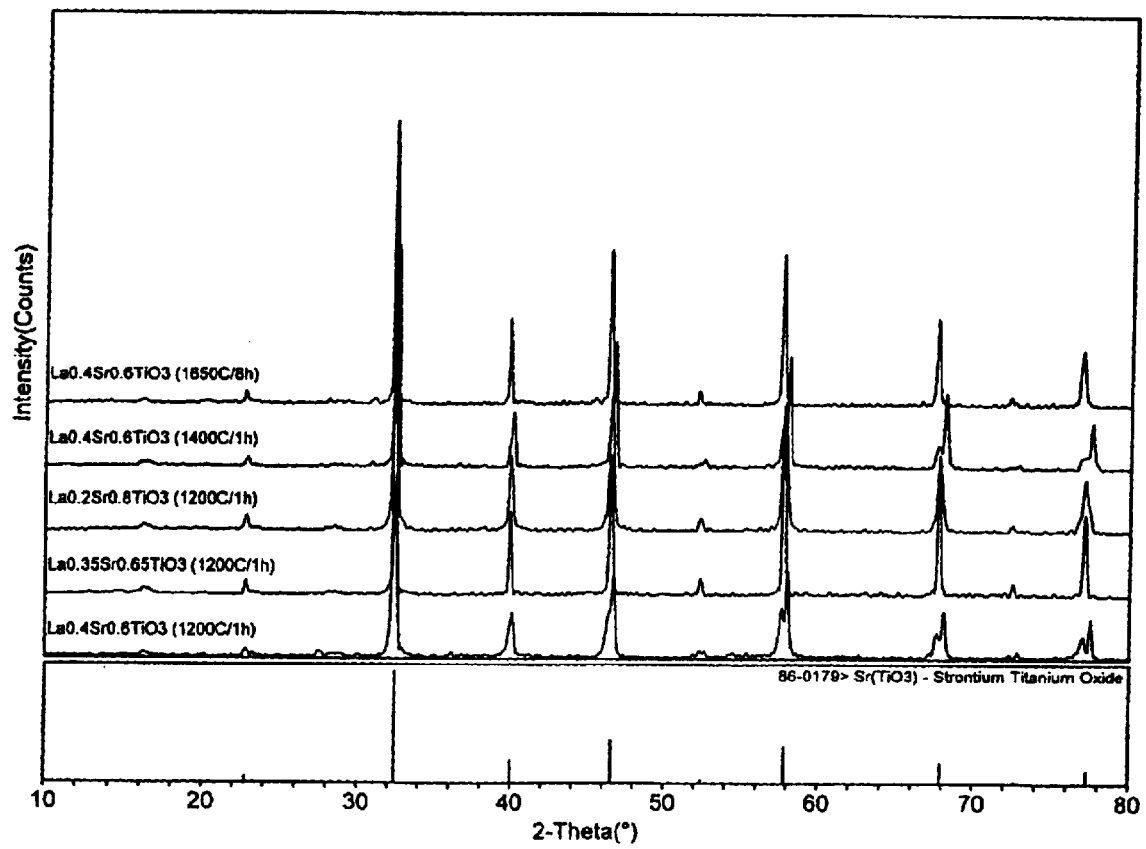
FIG. 4 is a plot showing X-ray diffraction patterns of $La_{0.2}Sr_{0.8}TiO_3$, $La_{0.35}Sr_{0.65}TiO_3$, and $La_{0.4}Sr_{0.6}TiO_3$ powders calcined in air.

For use in the experiments reported herein, cerium-modified doped strontium titanate powders were prepared from mixed nitrate solutions by a glycine/nitrate combustion process using a stoichiometric fuel/oxidant ratio, and powder calcination at 1000-1400° C. (i.e., for about 2 hours). After that phase compositions were analyzed by a X-ray powder diffraction method. A single-phase cubic perovskite structure similar to undoped $SrTiO_3$ was confirmed for all powders without cerium, FIG. 4. For those powders where x was close to the solubility limit, second perovskite structure with orthorhombic symmetry was also determined. No phase change was observed after annealing all the compositions at 1650° C. either in air or in 2% hydrogen in argon.

Figure 5:
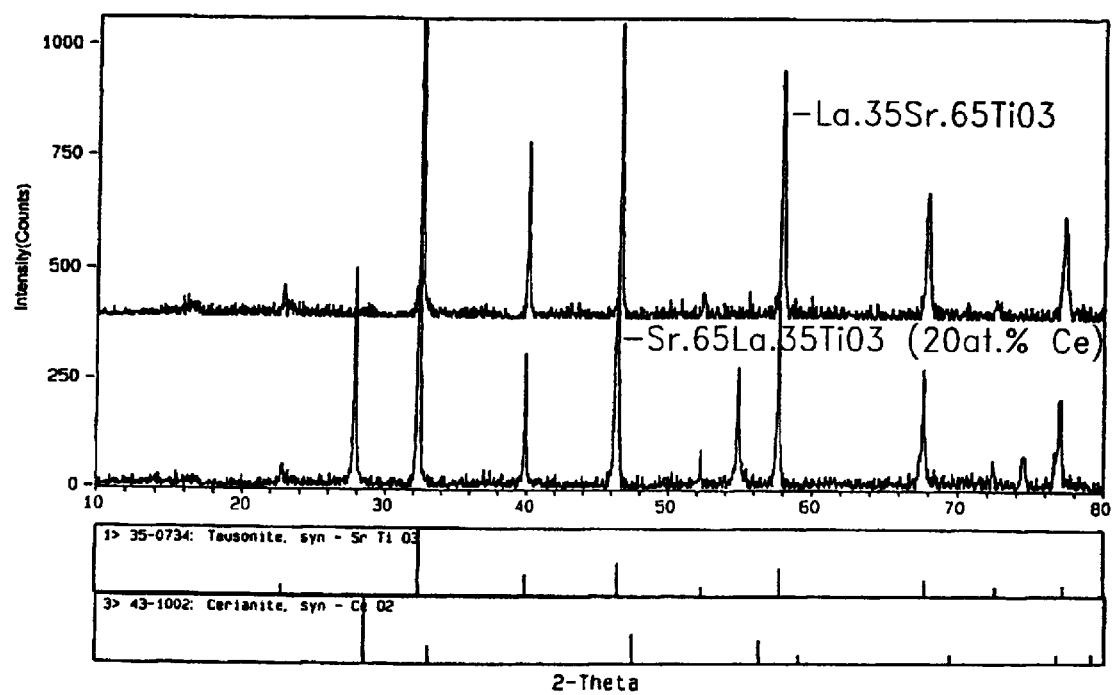
FIG. 5 is a plot showing X-ray diffraction patterns of $La_{0.35}Sr_{0.65}TiO_3$ and cerium-modified $La_{0.35}Sr_{0.65}TiO_3$ powders (y=20 at. %) calcined in air at 1600° C.

For the cerium-modified powders, a phase other than a perovskite structure was observed, mostly a cubic fluorite-like $CeO_2$, FIG. 5, which amount increased as the atomic percent of cerium added increased. Modification with cerium was also accompanied by an increase in the cell parameters of the perovskite-type structure from 3.910 to 3.917, which indicates possible cerium incorporation into the perovskite structure. The cell parameters of the second phase were also changed in respect to pure $CeO_2$ (FIG. 5) indicating ceria doping with another oxide or, most likely, a mixture of La and Sr oxides. At y>0.5, the presence of a $SrCeO_3$ perovskite and $Sr_2TiO_4$ spinel was also detected. At the same time, TEM, backscatter SEM, EDS and EDX analyses performed on the anodes sintered at 1000° C. did not reveal any other than a perovskite phase.

After that the powders were attrition milled to reduce the average particle size to less than 0.5 μm. The attrition milling procedure included powder milling with media for 5 minutes at 550 rpm, sampling and checking the particle size. If the average particle size was larger than desired, the powder was attrition milled until the desired particle size was reached. After that, the powder was removed from the mill, dried, and passed through a 325 mesh screen. Electrode inks were prepared by mixing the powder with a commercial binder in a 3-roll mill. Electrode inks were used to construct test cells as discussed in greater detail below.

Figure 6:
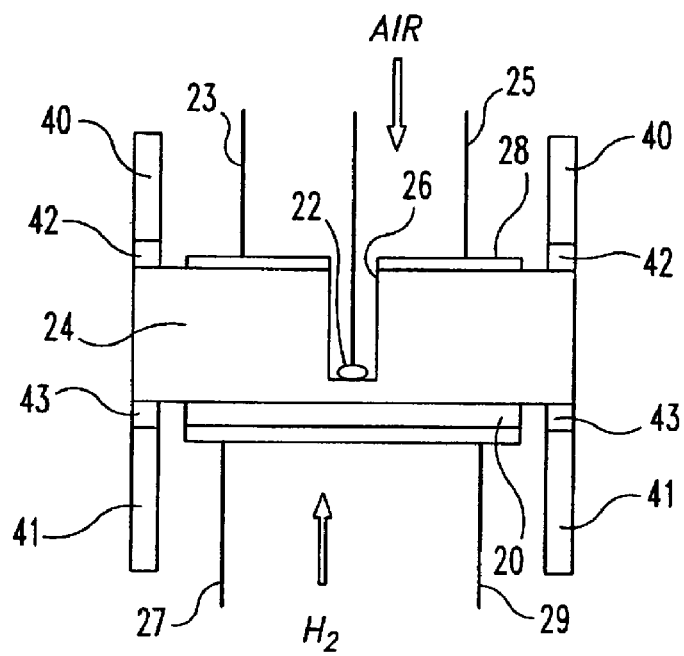
FIG. 6 depicts a side sectional view of the configuration of a three-electrode cell as described in the Examples for use in anode polarization studies.

Two types of cells were constructed and employed in the methods described herein, one having a two-electrode configuration, and another having a three-electrode configuration. In the three-electrode configuration, as depicted in FIG. 6, the potential is measured between the doped titanate electrode 20 and a non-polarizable reference electrode 22, to determine the specific anode polarization loss, i.e., anode overpotential, by two complimentary techniques—DC current interrupt and AC impedance spectroscopy. Three-electrode cells were based on a dense 3 mm-thick 8 mole % $Y_2O_3$-stabilized $ZrO_2$ (Tosoh) cylindrical pellet 24 isostatically pressed and sintered at 1400° C. in air. Each pellet had a 1 mm diameter bore 26 in the center on one side with platinum point reference electrode 22 placed into it. A platinum paste auxiliary electrode 28 was screen-printed in a circular pattern on the same side of pellet 24. Anode ink 20 was screen-printed symmetrically on the opposite side of the YSZ pellet and sintered at 850-1200° C. in air.

Figure 7:
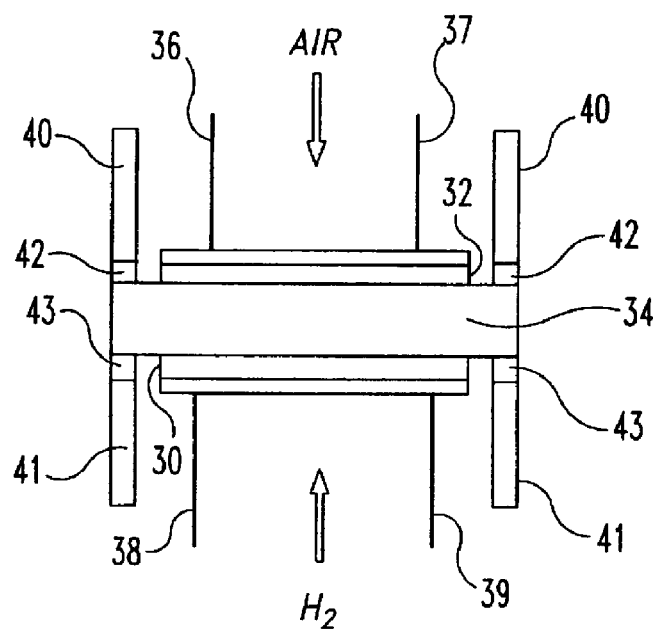
FIG. 7 depicts a side sectional view showing a two-electrode cell geometry for the studies described in the Examples.

The two-electrode configuration, as depicted in FIG. 7, was used to assess the performance of fuel cells with anodes comprising the various anode compositions as described below. In the two-electrode configuration, the anode 30 and a strontium-doped lanthanum ferrite cathode or strontium-doped lanthanum cobaltite cathode 32 were symmetrically screen-printed on the opposite sides of the dense 160 μm-thick 8 mole % $Y_2O_3$-stabilized $ZrO_2$ (DKK, sintered at 1400° C.) electrolyte disc 34 and sintered in air to form the 10-20 μm-thick porous layers. To prevent the electrolyte 34 from iron or cobalt diffusion on the cathode side at elevated sintering temperatures (typically 950-1200° C. for the present examples unless specified otherwise) and improve the bonding to the electrolyte 34, a 2-5 μm barrier layer of 10 mole % samaria-doped ceria (not shown) was deposited on the YSZ electrolyte 34 prior to the cathode 32 and fired at 1200° C. Platinum paste grids (not shown) were deposited onto the each electrode 30, 32 to ensure proper current collection by spring-loaded four-terminal Pt current collecting wires 36, 37, 38, 39. None of the Pt layers were pre-sintered; their sintering was carried out in the experimental setup.

Each cell was mounted between two vertical alumina tubes 40, 41 and isolated from the environment by sealing with gold rings 42, 43. The cell apparatus also included an electric furnace and a potentiostat. After the device was heated to 850-900° C. in air, hydrogen was introduced into the anode compartment to reduce the anode. The opposite side of the cell was supplied with air. The proximity (typically around 10 mV) of the electrode potential at zero current, i.e., open-circuit potential, to the thermodynamic potential expected under the experimental conditions was treated as an indication of good sealing in the set-up.

Experiments were performed at atmospheric pressure in the temperature range 550-900° C. The temperature was monitored by two thermocouples placed at the opposite sides of the YSZ disc. A mixture of hydrogen and nitrogen or methane and nitrogen saturated with water at room temperature ($pH_2O$ of about 3 kPa) prior to the reactor inlet was used as a fuel gas. The hydrogen partial pressure, $pH_2$, was varied from 2 to 97 kPa, the methane partial pressure, $pCH_4$, and the carbon monoxide partial pressure, pCO, was varied from 2 to 50 kPa. The gas flow was measured with mass flow controllers. The flow rate was varied from 20 to 200 $cm^3$/min. Hydrogen sulfide was added to the fuel gas from a 190 ppm mixture with nitrogen in certain experiments.

Electrochemical measurements were carried out using a Solartron 1280 frequency response analyzer in combination with a Solartron 1286 electrochemical interface over a frequency range from 10 μHz to 100 kHz. Complex impedance spectra and current-overpotential curves were acquired while altering the temperature, fuel gas partial pressures, and a gas flow rate. The electrode polarization resistance, $R_p$, related to the anode processes was determined either as the difference between the low-frequency and high-frequency intercepts on the X-axis on impedance spectra, or a slope of the current-overpotential curve. Since both methods resulted in almost identical values, no further distinction in methods used was made.

For other experimental procedures, powders were isostatically pressed into bars and sintered in air under empirically determined conditions, 1600-1650° C. for 8 hours, to obtain the maximum density of the samples. Also, some samples were sintered at 1650° C. for 8 hours under reducing conditions (i.e., 2% hydrogen in argon). Sintered bars were cut to produce dilatometry and electrical conductivity specimens. Depending on the sample composition, 75-92% of the theoretical density were attained. Conductivity specimens were wrapped with four platinum wires (referred to herein as "Pt wires"), which were held in place by small notches cut on the sample surfaces. The electrical conductivity was measured by a standard AC four-probe conductivity technique in oxidizing and reducing atmospheres. Reducing atmospheres were provided using a hydrogen/carbon dioxide buffered gas system. Thermal expansion and chemical expansion characteristics, i.e., dimensional changes due to changes in the ambient $pO_2$, were studied in a Unitherm 1161 dilatometer as a function of temperature and oxygen partial pressure. Dimensional changes were monitored in the $pO_2$ range $1$-$10^{-18}$ atm at 1000° C. and $1$-$10^{-22}$ atm at 800° C.

Example Two

Properties of Doped Strontium Titanates with and without Cerium Modification

Electrical Characteristics

Figure 8:
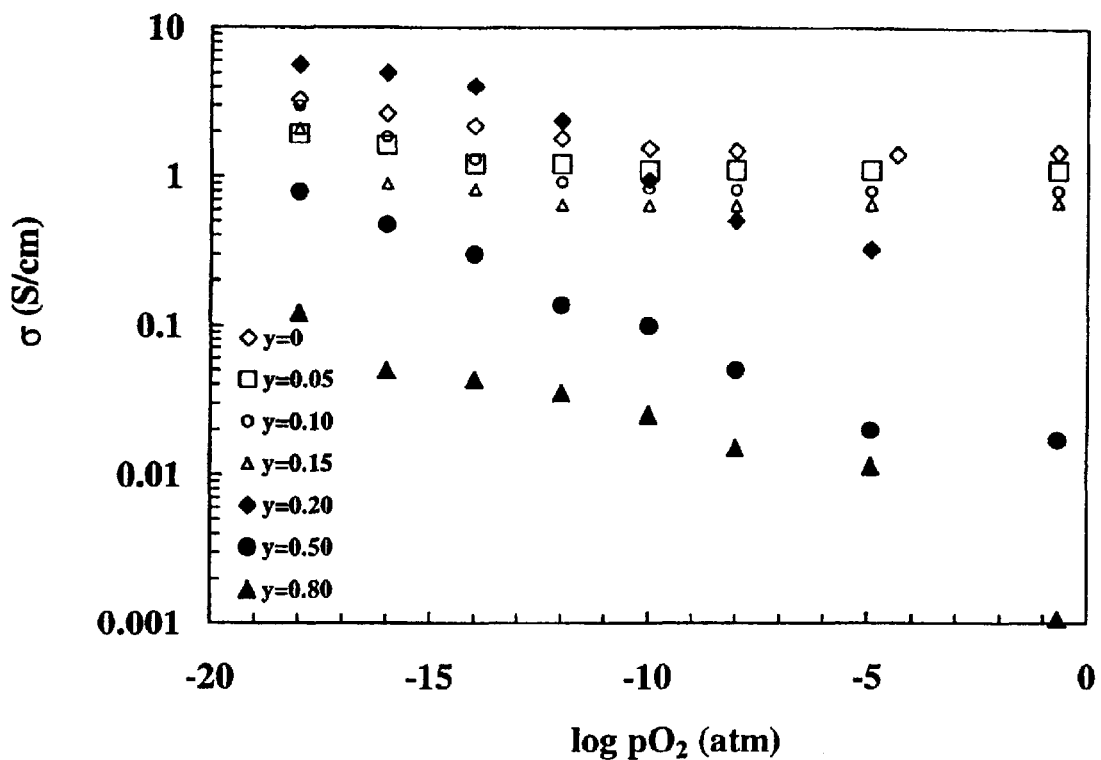
FIG. 8 is a plot showing the effect of oxygen partial pressure ($pO_2$) on electrical conductivity of cerium-modified $La_{0.35}Sr_{0.65}TiO_3$ (y=0 to 80 at. %) sintered in air. T=1000° C.
Figure 9:
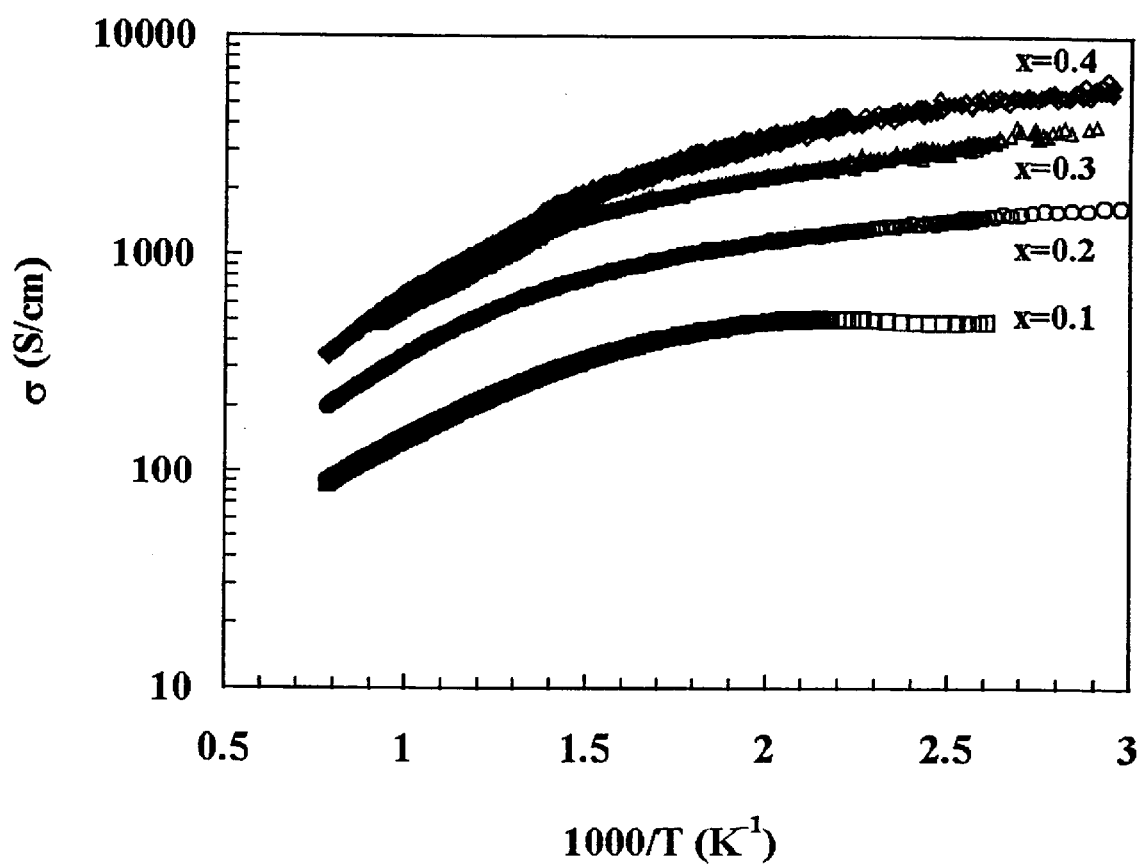
FIG. 9 is a plot showing the electrical conductivity of $La_xSr_{1-x}TiO_3$ (x=0.1-0.4) sintered in hydrogen while heating to 1000° C. in 4% hydrogen in argon buffered with $CO_2$, which corresponds to $pO_2=10^{-18}$ atm at 1000° C.
Figure 10:
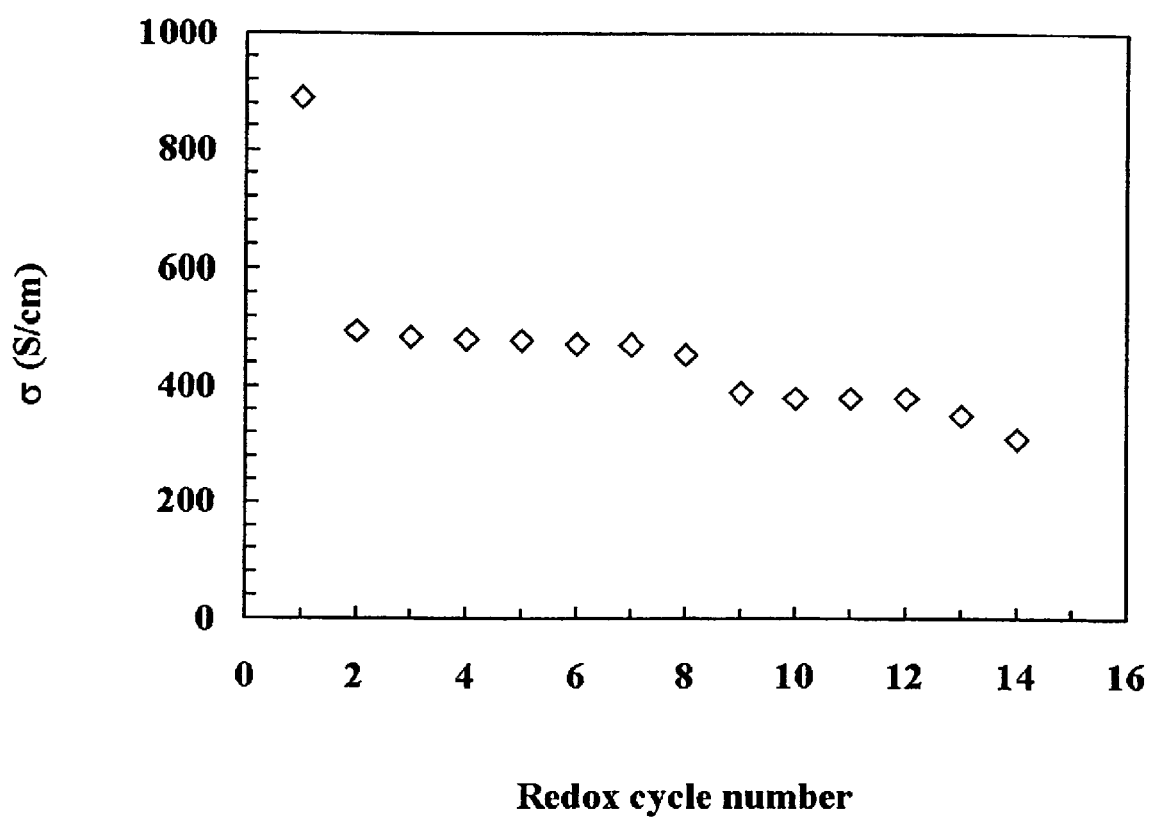
FIG. 10 is a plot showing the electrical conductivity of $La_{0.3}Sr_{0.7}TiO_3$ (sintered in hydrogen) in 4% hydrogen in argon buffered with $CO_2$ ($pO_2<10^{-30}$) at 500° C. after repeated oxidation-reduction cycles (exposure to air and returning to $pO_2=10^{-30}$ atm).

The electrical conductivity, σ, of $La_xSr_{1-x}TiO_3$ samples (both cerium-modified and unmodified) was determined as a function of the temperature, the gas environment, dopant amount, cerium amount and sintering conditions, FIGS. 8-10. All these factors were established to affect the electrical characteristics of $La_xSr_{1-x}TiO_3$ samples (both cerium-modified and unmodified). It was also observed that the initial conductivity of $La_xSr_{1-x}TiO_3$ samples (both cerium-modified and unmodified) was strongly dependent on the $pO_2$ during sample sintering, i.e., the degree of reduction.

FIG. 8 shows the oxygen partial pressure effect on electrical conductivity of cerium-modified $La_xSr_{1-x}TiO_3$ samples sintered in air (various samples have various atomic ratios of cerium to pre-modification titanium. Atomic ratios are provided in terms of atomic percent, or "y". For this experiment, "y" ranged from 0 to 80 atomic percent, which is also represented by the values 0-0.8, respectively). It is seen that for all compositions, the electrical conductivity, σ, increases with lowering $pO_2$. It increased with an A-site dopant amount x increase (not shown) and is only slightly affected by varying y when y<0.5. Higher cerium amounts (0.5<y<0.8) decrease conductivity compared to that with y=0, most likely due to formation of an excess of a lower-conducting ceria second phase.

For the samples sintered in a reducing environment at the same temperature of 1650° C., an electrical conductivity on the order of 400-5,000 S/cm was exhibited at room temperature both in air and in hydrogen. Such conductivity values are comparable with those of metals. When $La_xSr_{1-x}TiO_3$ samples were heated in 4% hydrogen in argon, the electrical conductivity decreased with increasing temperature and $pO_2$, indicating a positive temperature coefficient of resistance (a metallic-type behavior), FIG. 9. Under the experimental conditions typical for those of SOFC anode operation, e.g., T=700-1000° C., $10^{-15}$<$pO_2$<$10^{-20}$ atm, the titanates sintered in hydrogen exhibited a conductivity of 100-500 S/cm.

While the electrical conductivity of $La_xSr_{1-x}TiO_3$ sintered in air was completely reversible after reduction-oxidation cycling at 1000° C., that of the specimens sintered in hydrogen decreased irreversibly after the oxidation. As an example, the conductivity of $La_{0.3}Sr_{0.7}TiO_3$ sintered in hydrogen at 1650° C. after 14 reduction-oxidation cycles is shown in FIG. 10. The first point on FIG. 10 corresponds to the conductivity of a fully reduced sample heated in hydrogen to 500° C. The second point corresponds to conductivity measured at $pO_2=10^{-36}$ atm after overnight oxidation followed by reduction at 500° C. The following conductivity values were measured after brief (10-45 min) oxidations of $La_{0.3}Sr_{0.7}TiO_3$ followed by a return to the reducing conditions ($pO_2=10^{-36}$ atm). Even after 14 redox cycles at 500° C., the conductivity of the pre-reduced $La_{0.3}Sr_{0.7}TiO_3$ is still impressively high for the oxide material, ca. 300 S/cm and is sufficient for the material to be advantageously used as an electrode.

Thermal and Chemical Expansion

Figure 11:
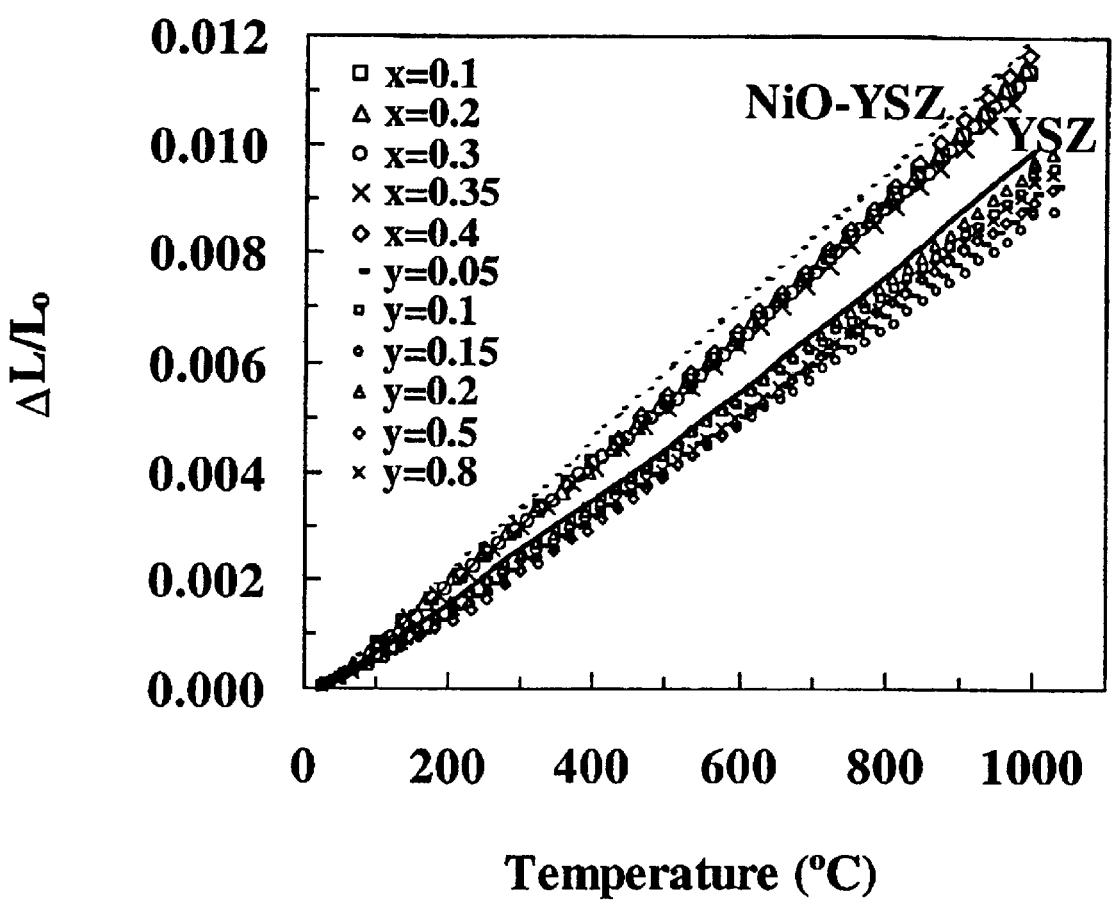
FIG. 11 is a plot showing the linear thermal expansion, $\Delta L/L_o$, of $La_xSr_{1-x}TiO_3$ (x=0.1-0.4) and cerium-modified $La_{0.35}Sr_{0.65}TiO_3$ (y=0 to 80 at. %) sintered in air, NiO—YSZ (dotted line), and YSZ (solid line) measured in stagnant air with a ramping rate of 2° C./min.
Figure 12:
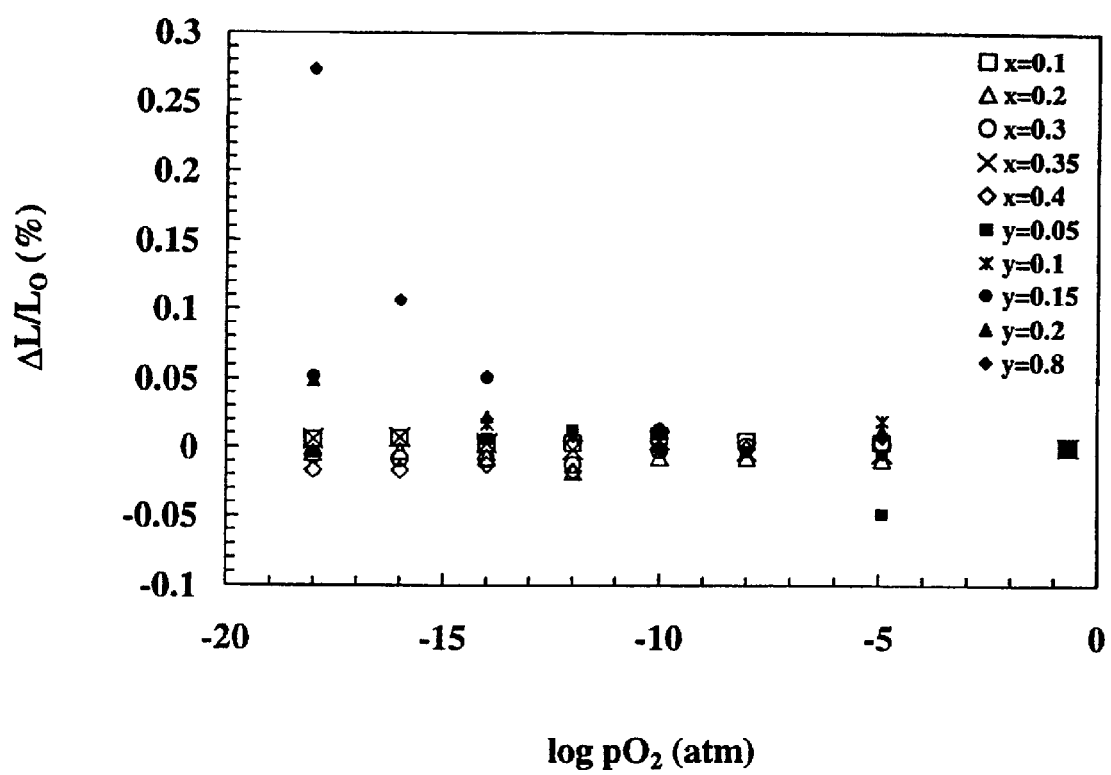
FIG. 12 is a plot showing the effect of oxygen partial pressure ($pO_2$) on relative expansion ($\Delta L/L_o$) of $La_xSr_{1-x}TiO_3$ (x=0.1-0.4) and cerium-modified $La_{0.35}Sr_{0.65}TiO_3$ (y=0 to 80 at. %) sintered in air. T=1000° C. Measurements started in air and finished at $pO_2=10^{-18}$ atm.

The thermal expansion behavior of $La_xSr_{1-x}TiO_3$ (x=0.1-0.4) and cerium-modified $La_{0.35}Sr_{0.65}TiO_3$ (y=0-0.8) sintered in air is shown in FIGS. 11-12. For comparison, the thermal expansion of 8 mole % yttria-doped zirconia and a NiO-YSZ cermet are plotted as well. It is seen that, compared to a conventional nickel-based anode, the lanthanum-doped strontium titanates offer a better thermal expansion match to YSZ with the cerium-modified materials being the most favorable. The average thermal expansion coefficients (TEC) calculated in the temperature range 50-1000° C. were between $11$-$12 \times 10^{-6}$ $K^{-1}$ for La-doped $SrTiO_3$ and $9.5$-$10 \times 10^{-1}$ $K^{-1}$ for Ce-modified $La_xSr_{1-x}TiO_3$.

It is essential for the SOFC stack integrity that an anode material does not expand or contract significantly when exposed to a wide variation in $pO_2$. Therefore, the effect of oxygen partial pressure on the dimensional stability of $La_xSr_{1-x}TiO_3$ (x=0.1-0.4) at T=1000° C. was studied. As given in FIG. 12, for cerium-modified $La_xSr_{1-x}TiO_3$ sintered in air, the measurements began in air and finished at $pO_2=10^{-18}$. It is seen that a relative expansion, $\Delta L/L_o$, less than 0.1% was observed for all of the cerium-modified $La_xSr_{1-x}TiO_3$ compositions with the only exception of y=0.8. An expansion of less than 0.1% is believed to be acceptable for the materials used in SOFCs.

Figure 13:
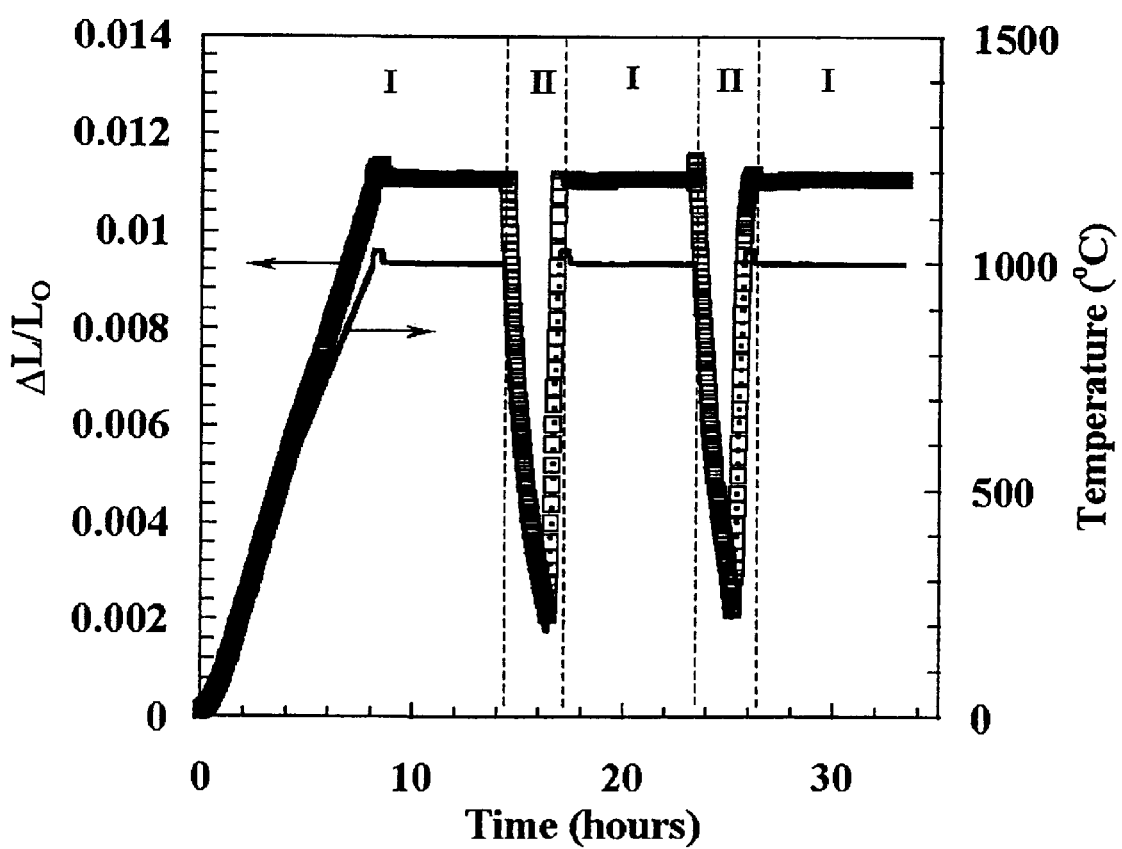
FIG. 13 is a plot showing the effect of reduction-oxidation cycling on relative expansion of $La_{0.4}Sr_{0.6}TiO_3$ sintered in hydrogen and heated to 1000° C. in 4% hydrogen in argon. Area I corresponds to $pO_2=10^{-18}$ atm, area II corresponds to $pO_2=0.21$ atm.

For $La_xSr_{1-x}TiO_3$ compositions sintered in hydrogen the measurements were performed in the inverse order, from $pO_2=10^{-18}$ to the air. It was observed that rapid thermal cycling of a $La_xSr_{1-x}TiO_3$ specimen, which can be considered as a simulation of rapid thermal cycling of an SOFC system where the anode is not protected by supplying a reducing gas during heat-up and cool-down, did not affect the sample dimensions. As an example, FIG. 13 shows that a $La_{0.4}Sr_{0.6}TiO_3$ sample sintered in a reducing environment was heated to 1000° C. in 4% hydrogen in argon. After that, it was exposed to air while being rapidly cooled to 250° C. and heated up to 1000° C. (simulating an unprotected thermal cycle). When the temperature reached 1000° C., the $La_{0.4}Sr_{0.6}TiO_3$ sample was again exposed to 4% hydrogen in argon (simulating SOFC operation). As seen in FIG. 13, $\Delta L/L_o$ at 1000° C. after two redox cycles was unchanged compared to that before the redox cycling. The only dimensional changes observed were those associated with thermal expansion.

Electrocatalytic Properties

Figure 14:
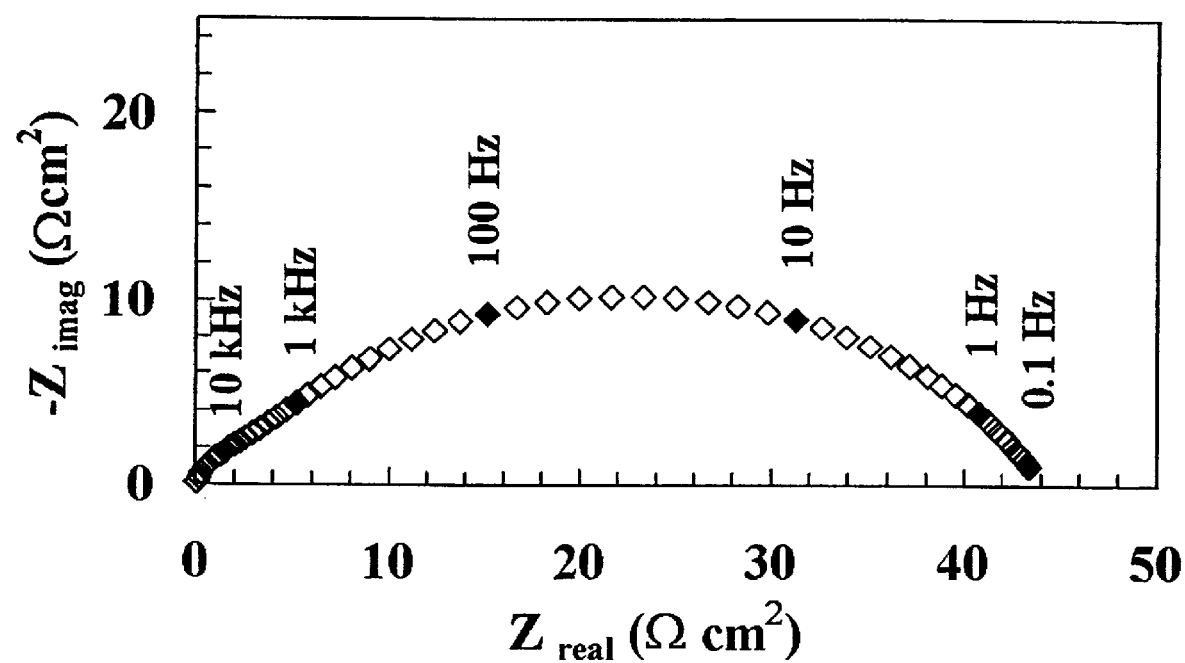
FIG. 14 depicts a complex impedance spectrum obtained on a $La_{0.4}Sr_{0.6}TiO_3$ electrode at T=850° C. in $H_2/H_2O=97/3$ vs. Pt/air. Frequencies are marked.

A typical complex impedance spectrum obtained on a lanthanum doped strontium titanate anode in wet hydrogen at 850° C. at the open-circuit potential is illustrated in FIG. 14. All impedance spectra given herein are corrected for the ohmic drop in the YSZ electrolyte pellet between the working electrode and the reference electrode and, therefore, moved to the origin. The ohmic drop was defined from the high-frequency intercept on the X-axis and was typically around $3\Omega$. As seen in FIG. 14, the polarization resistance of the $La_{0.4}Sr_{0.6}TiO_3$ anode at 850° C. in wet hydrogen is 44 $\Omega cm^2$. This steady state value was achieved in about 3 hours after the anode exposure to the wet hydrogen and is almost four times higher than the initial one obtained almost instantaneously after turning the fuel gas on. A similar trend was observed for the $La_{0.35}Sr_{0.65}TiO_3$ anode and the corresponding steady state value is given in Table 1. Even higher polarization resistance values were obtained on the doped strontium titanate anodes of the formula $A_xSr_{1-x}TiO_3$ (A=La, Y; x=0.1-0.3) under the identical experimental conditions. Such high polarization resistances attest to the poor electrocatalytic activity of A-site doped strontium titanates towards hydrogen, possibly due to weak hydrogen chemisorption.

Figure 15:
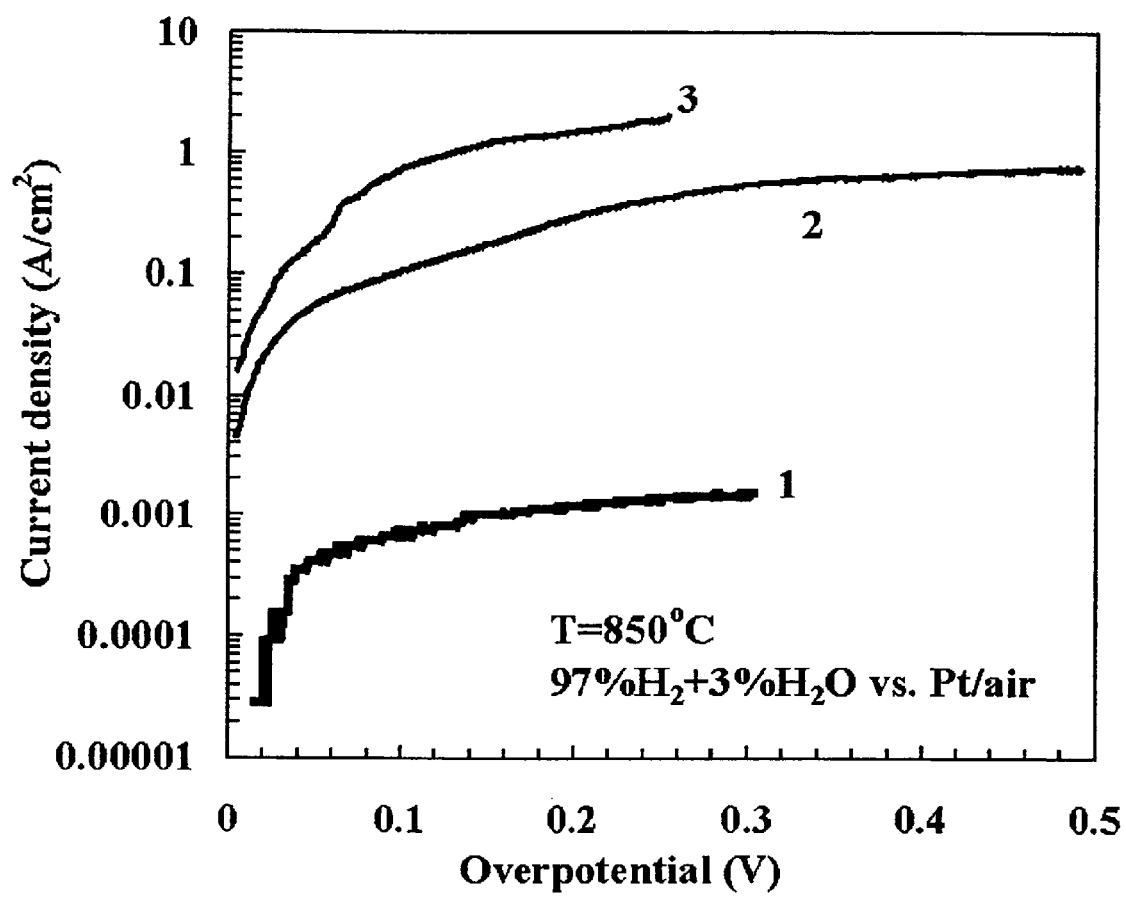
FIG. 15 is a plot showing I-V curves obtained for $La_{0.35}Sr_{0.65}TiO_3$ (1), $La_{0.35}Sr_{0.65}TiO_3$+5 wt % Ni (2) and Ni-YSZ cermet anodes (3) at T=850° C., $H_2/H_2O=97/3$, and a flow rate of 100 cm³/min.

FIG. 15 illustrates the effect of a catalyst addition to the lanthanum doped titanate electrode with respect its activity for the fuel oxidation. Curve 1 corresponds to the $La_{0.35}Sr_{0.65}TiO_3$ anode obtained in wet hydrogen at 850° C. Curve 3 is a standard Ni-YSZ cermet anode under the similar conditions. It is seen that Ni-YSZ anode exhibits almost three orders of magnitude greater performance hydrogen oxidation than $La_{0.35}Sr_{0.65}TiO_3$. Curve 2 corresponds to a $La_{0.35}Sr_{0.65}TiO_3$ anode with 5 wt % Ni added (by impregnation with nickel nitrate followed, at first, by calcination in air and then reduction of NiO to Ni in hydrogen). It is seen that only 5 wt % of nickel significantly improve the $La_{0.35}Sr_{0.65}TiO_3$ anode performance. The polarization resistance value of Ni—$La_{0.35}Sr_{0.65}TiO_3$ anode is listed in Table 1. Thus, infiltration of nickel nitrate solution into the sintered porous oxide anode followed by reduction or physical mixing of $La_xSr_{1-x}TiO_3$ with an appropriate catalyst for the fuel oxidation (e.g., metal nickel or others) results in remarkable improvement in the ceramic anode performance.

TABLE 1

Area specific polarization resistances, $R_p$, of the lanthanum doped strontium titanates (including unmodified, cerium-modified and transition metal-modified samples) obtained at 850° C. in $H_2/H_2O$ = 97/3 vs. Pt/air.

| Composition | $R_p$, $\Omega cm^2$ |
| --- | --- |
| $La_{0.35}Sr_{0.65}TiO_3$ | 52 |
| $La_{0.4}Sr_{0.6}TiO_3$ | 44 |
| (5 wt. % Ni)—$La_{0.4}Sr_{0.6}TiO_3$ | 1.0 |
| Nickel-modified $La_{0.35}Sr_{0.65}TiO_3$ (20 at. %) | 48 |
| Cobalt-modified $La_{0.35}Sr_{0.65}TiO_3$ (20 at. %) | 39 |
| Copper-modified $La_{0.35}Sr_{0.65}TiO_3$ (20 at. %) | 60 |
| Chromium-modified $La_{0.35}Sr_{0.65}TiO_3$ (20 at. %) | 47 |
| Iron-modified $La_{0.35}Sr_{0.65}TiO_3$ (20 at. %) | 21 |
| Cerium-modified $La_{0.35}Sr_{0.65}TiO_3$ (5 at. %) | 1.5 |
| Cerium-modified $La_{0.35}Sr_{0.65}TiO_3$ (10 at. %) | 0.4 |
| Cerium-modified $La_{0.35}Sr_{0.65}TiO_3$ (15 at. %) | 0.3 |
| Cerium-modified $La_{0.35}Sr_{0.65}TiO_3$ (20 at. %) | 0.2 |
| Cerium-modified $La_{0.35}Sr_{0.65}TiO_3$ (50 at. %) | 3.6 |

The sintering temperature of anodes on YSZ is 1000° C.

Figure 16:
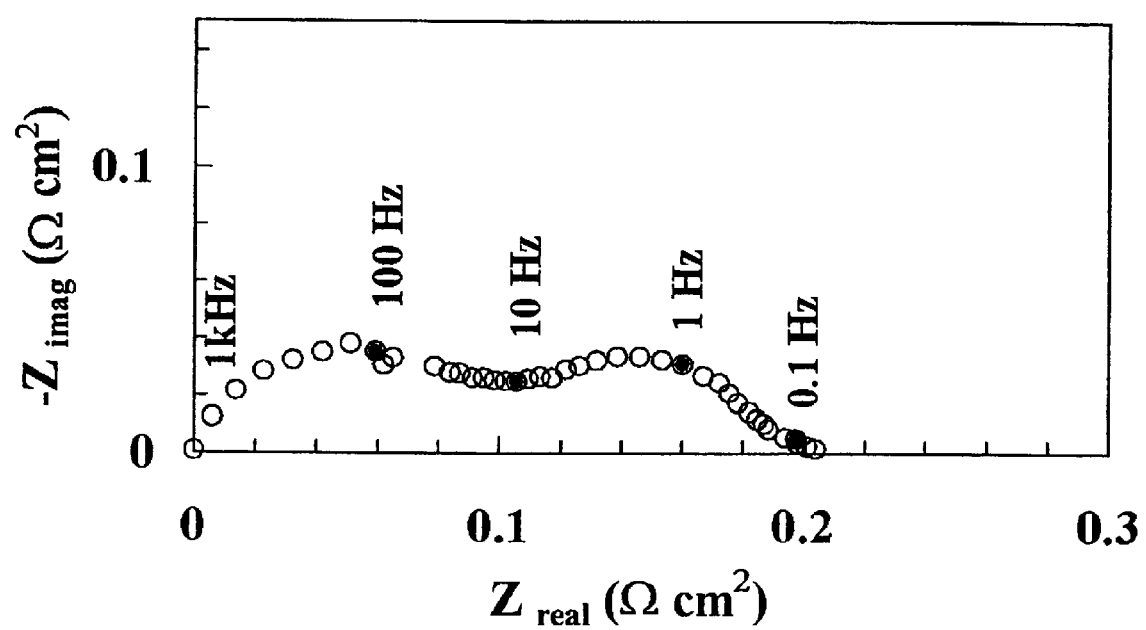
FIG. 16 depicts a complex impedance spectrum obtained on a cerium-modified $La_{0.35}Sr_{0.65}TiO_3$ (y=20 at. %) electrode at T=850° C. in $H_2/H_2O=97/3$ vs. Pt/air. Frequencies are marked.

It is also seen in Table 1 that cerium modification dramatically increases the electrocatalytic activity of the lanthanum-doped titanate towards hydrogen, and a polarization resistance of 0.2 $\Omega cm^2$ for a cerium-modified $La_{0.35}Sr_{0.65}TiO_3$ (y=20 at. %) anode is obtained at 850° C. This value is comparable to that of the standard Ni-YSZ and surpasses other oxide-based anodes developed to date. A typical complex impedance spectrum obtained on a cerium-modified $La_{0.35}Sr_{0.65}TiO_3$ (y=20 at. %) anode in wet hydrogen is given in FIG. 16.

Figure 17:
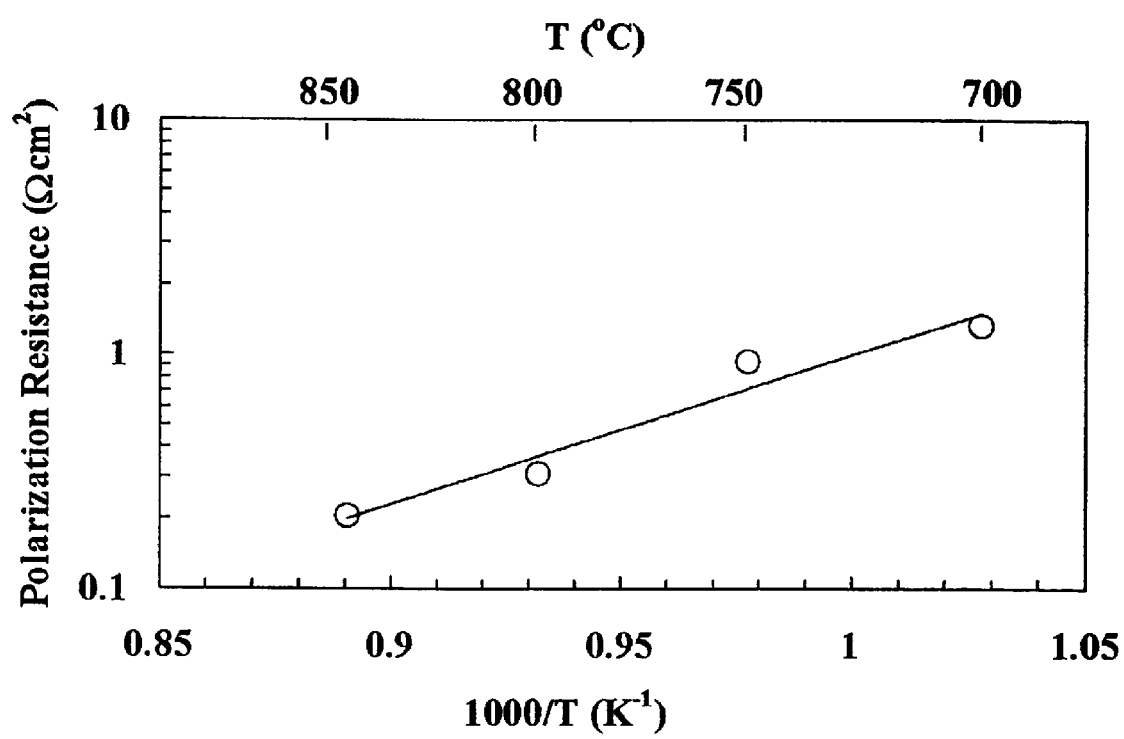
FIG. 17 is a plot showing the effect of temperature on the area specific polarization resistance of the cerium-modified $La_{0.35}Sr_{0.65}TiO_3$ (y=20 at. %) anode in $H_2/H_2O$=97/3 vs. Pt/air.

Temperature effect on the area specific polarization resistance of a cerium-modified $La_{0.35}Sr_{0.65}TiO_3$ (y=20 at. %) sample in wet hydrogen at the equilibrium electrode potential is summarized in an Arrhenius type plot in FIG. 17. Decreasing temperature from 850 to 700° C. results in concomitant increasing the $R_p$ to 1.3 $\Omega cm^2$. Such a value of the polarization resistance for the ceramic material is acceptable for use in a variety of electrochemical devices. It is important that no degradation in cerium-modified $La_{0.35}Sr_{0.65}TiO_3$ (y=10-20 at. %) anode performance with time (over 100 hours tested) was observed.

Effect of the cerium amount on the lanthanum-doped titanate anode properties was studied and the results are given in Table 1. It is seen that 10-20 at. % of the cerium was seen to be optimum in these experiments.

Example Three

Properties of Lanthanium-Doped Strontium Titanates Including Transition Metals as B-Site Dopants Another set of experiments was directed to modifying $La_xSr_{1-x}TiO_3$ with various transition metals, Ni, Co, Fe, Cr, and Cu, to produce transition metal-modified $La_xSr_{1-x}TiO_3$, where x=0.1-0.4.

20 at % nickel-modified, copper-modified, iron-modified, chromium-modified and cobalt-modified lanthanum-doped strontium titanate powders, $La_xSr_{1-x}TiO_3$, where x=0.1-0.4, were prepared by glycine/nitrate combustion methods as described above. After calcination at 1200° C. for 2 h, powders were attrition milled to reduce the average particle size to less than 0.5 µm, and electrode inks were prepared by mixing the powder with a commercial binder in a 3-roll mill as described above. As determined by X-ray powder diffraction, all metal-modified $La_{0.35}Sr_{0.65}TiO_3$ (with metal added at 20 at. % and where the metal is Ni, Cu, Fe, Cr and Co, respectively) showed a single-phase cubic perovskite structure similar to undoped $SrTiO_3$.

As seen in Table 1, B-site doping of the $La_xSr_{1-x}TiO_3$ perovskite with various transition metals affects the anode performance. The polarization resistance values range from 21 to 60 $\Omega cm^2$. Thus, depending on the transition-metal choice it is possible to improve the $La_{1-x}Sr_xTiO_3$ anode performance, at least, by a factor of two (e.g., in case of Fe).

Example Four

Figure 18:
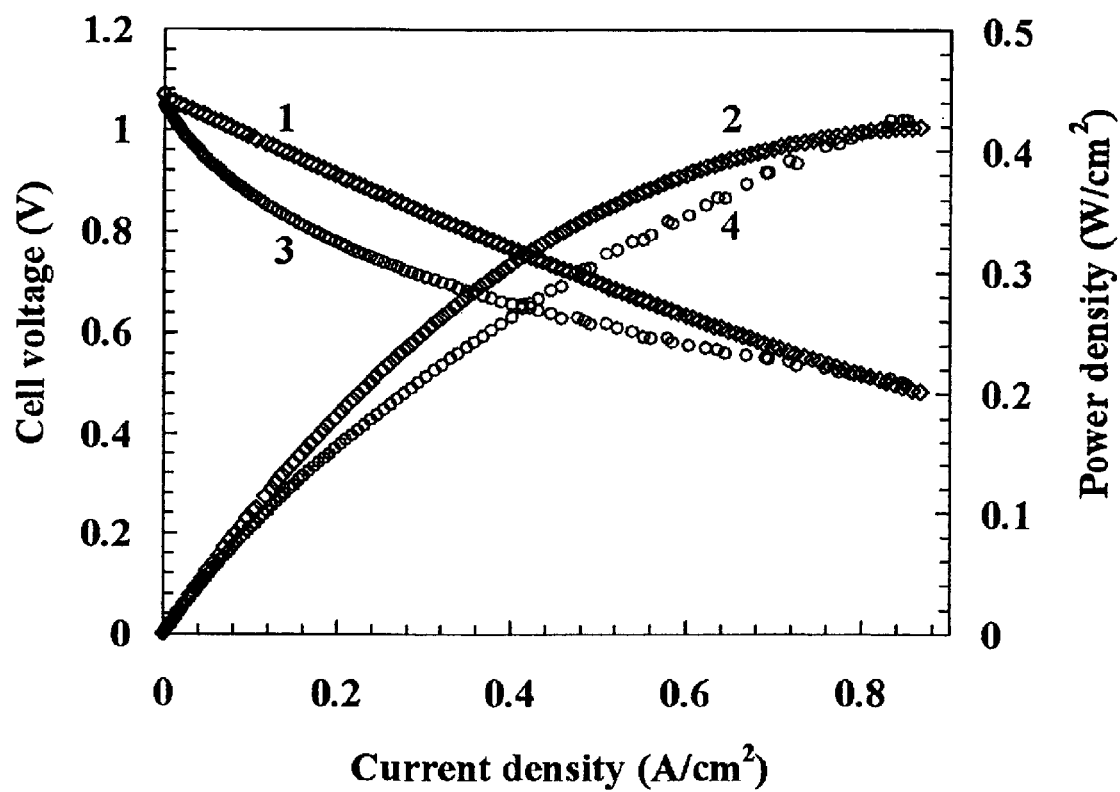
FIG. 18 is a plot showing the variation of the terminal voltage (1, 3) and power density (2, 4) for 160 μm electrolyte-supported cells with doped cobaltite-based cathodes and cerium-modified $La_{0.35}Sr_{0.65}TiO_3$ (y=20 at. %) (1,2) or Ni-YSZ (3,4) anodes as a function of the current density. T=800° C. Fuel is $H_2/H_2O$=97/3, an oxidant is air.

Performances of Solid Oxide Fuel Cells with Cerium-Modified Lanthanium-Doped Strontium Titanate Anodes FIG. 18 presents performances of 160 µm-thick electrolyte-supported cells with doped ferrite cathode and either cerium-modified $La_{0.35}Sr_{0.65}TiO_3$ (y=20 at. %) (curves 1 and 3), or standard Ni-YSZ cermet anodes (curves 2 and 4) at 800° C. It is seen that at 0.7 Volt the cell with the cerium-modified $La_{0.35}Sr_{0.65}TiO_3$ (y=20 at. %) anode generates a power density of 350 mW/cm². All other factors being equal, the cell with the Ni-YSZ anode generates 220 mW/cm². Thus, the cerium-modified $La_{0.35}Sr_{0.65}TiO_3$ (y=20 at. %) anode is shown here to exhibit performance in hydrogen comparable to or exceeding that of state-of-the-art Ni-based cermet. No degradation in performance of cells with cerium-modified $La_{0.35}Sr_{0.65}TiO_3$ (y=10-20 at. %) anodes was traced over the maximum tested time of 200 hours.

Effect of Alternative Fuels on Anode Performance

Figure 19:
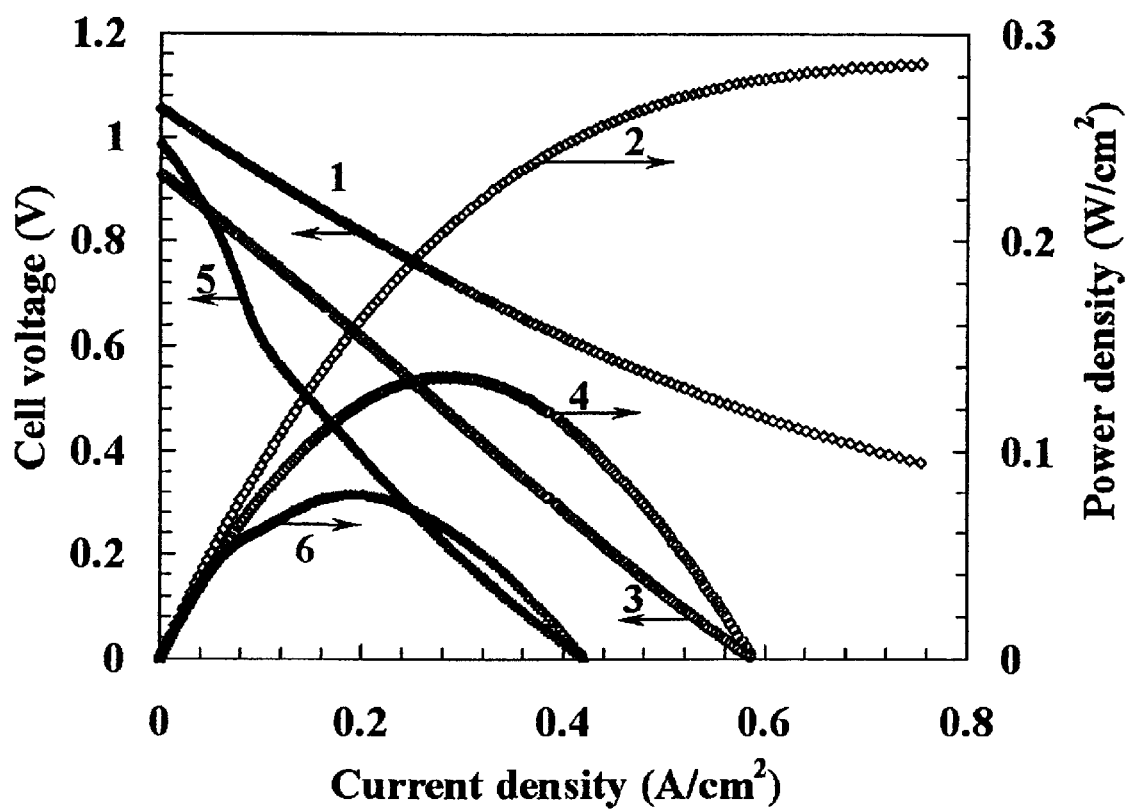
FIG. 19 is a plot showing the variation of the terminal voltage (1, 3, 5) and power densities (2, 4, 6) of the 160 μm electrolyte-supported cell with doped ferrite cathode and cerium-modified $La_{0.35}Sr_{0.65}TiO_3$ (y=20 at. %) anode as a function of the current density at T=800° C. Fuel is $H_2$ (1, 2), $CH_4$ (3, 4) and CO (5, 6) at fuel/$N_2$/$H_2O$=48.5/48.5/3. An oxidant is air.

FIG. 19 illustrates performance of the electrolyte-supported cell with the cerium-modified $La_{0.35}Sr_{0.65}TiO_3$ (y=20 at. %) anode at 800° C. in three different fuels—hydrogen, methane and carbon monoxide. It is seen that the activity of the cerium-modified $La_{0.35}Sr_{0.65}TiO_3$ (y=20 at. %) decreases from hydrogen to $CH_4$ and CO. While it is not intended that the present invention be limited by any theory whereby it achieves its advantageous result, it is contemplated that the ability of the cell to produce electrical energy from methane and carbon monoxide fuels is due to either direct electrochemical oxidation of methane and carbon monoxide, or steam reforming of methane and the gas-shift reaction to hydrogen followed by electrochemical oxidation of hydrogen. It is most notable that after expositing the cerium-modified doped strontium titanate anodes to such high carbon-to-water ratios for over 48 hours, no carbon deposition was detected using an optical microscope, and no performance degradation was detected. This is in stark contrast to the nickel-based anodes.

Effect of Oxidation-Reduction Cycles on Anode Performance

Effect of the oxidation-reduction tolerance of the cerium-modified $La_{0.35}Sr_{0.65}TiO_3$ anode was studied at 800-850° C. After obtaining cell current-voltage characteristics in wet hydrogen, the fuel was turned off and the anode was blown with air for 0.5-12 hours. Anode oxidation was monitored by a cell potential drop to 0 Volt vs. air. When the hydrogen fuel was fed to the anode, the cell voltage increased to about 1.1 Volt indicating the reducing environment and anode reduction. After that another current-voltage curve was obtained. Comparing two curves (before and after the oxidation-reduction cycles) did not reveal any deterioration in cell performance. Thus, the cerium-modified doped titanate-based anode did not undergo any chemical and microstructural changes upon reduction-oxidation cycling. It is important to note that less than 0.06% relative expansion is observed for cerium-modified $La_{0.4}Sr_{0.6}TiO_3$ (y=20 at. %) upon exposing to a highly reducing atmosphere ($pO_2=10^{-16}$ kPa) at 1000° C. These characteristics make the subject materials excellent candidates use in an SOFC stack assembly. Furthermore, the average thermal expansion coefficients of $9.5 \times 10^{-6}$ $K^{-1}$ calculated in the temperature range 100-1000° C. are favorably in a good match with that of YSZ ($10 \times 10^{-6}$ $K^{-1}$), which alleviates potential problems associated with anode sintering on YSZ and frequent thermal cycling.

Effect of Hydrogen Sulfide on Anode Performance

Figure 20:
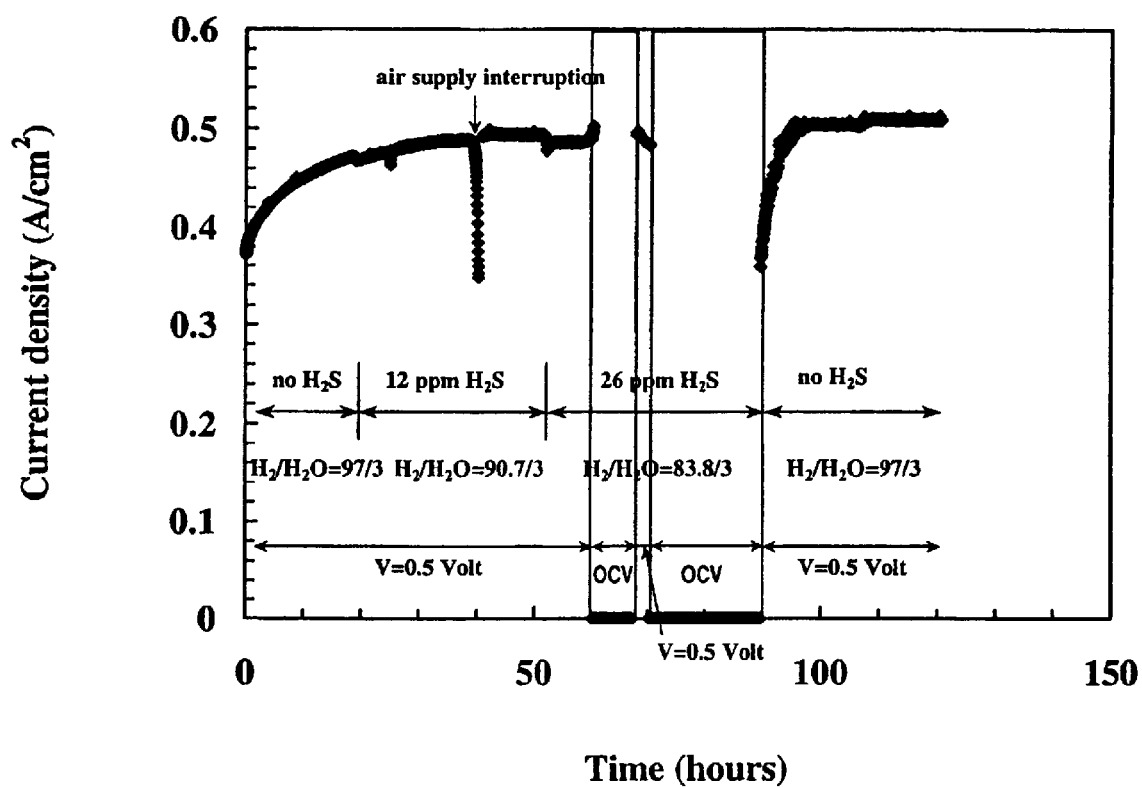
FIG. 20 is a plot showing the performance of the 160 μm electrolyte-supported cell with doped ferrite cathode and cerium-modified $La_{0.35}Sr_{0.65}TiO_3$ (y=15 at. %) anode at T=800° C. in wet hydrogen or wet hydrogen with added $H_2S$. Cell is either loaded (V=0.5 Volt) or left at the open-circuit voltage (OCV). Balance gas is nitrogen, oxidant is air.
Figure 21:
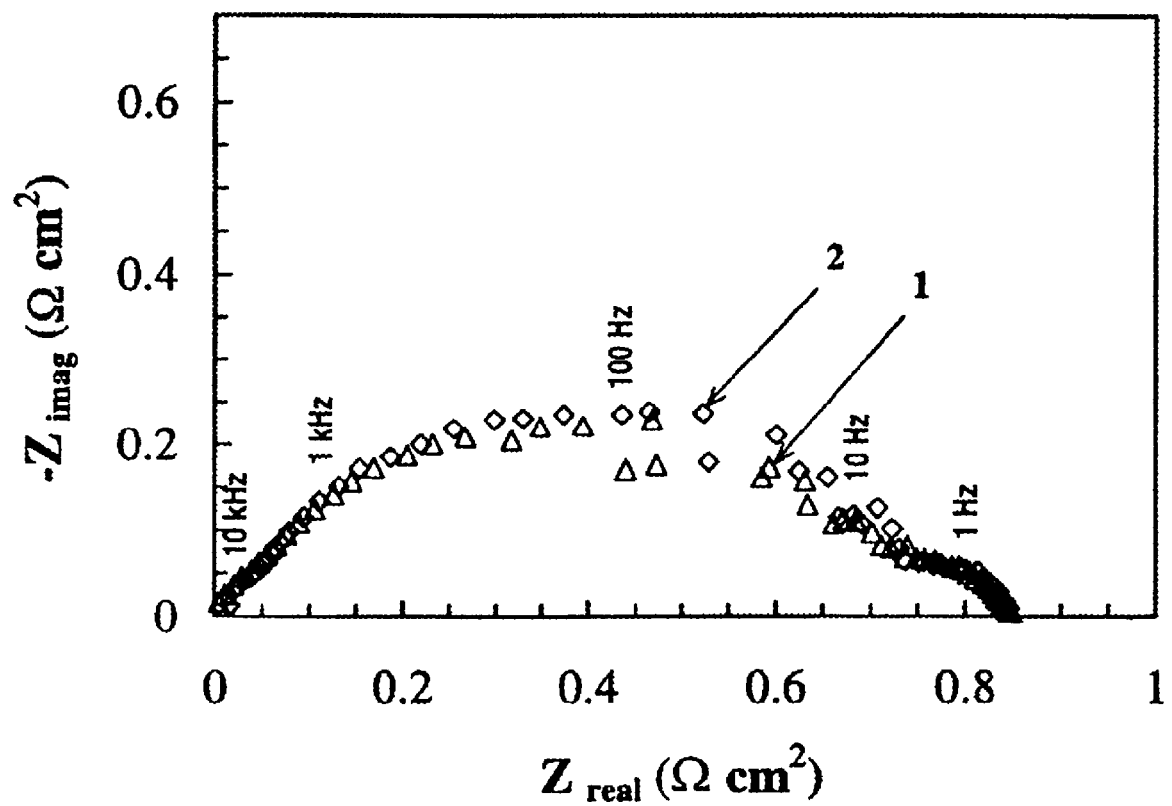
FIG. 21 depicts complex impedance spectra obtained on a cerium-modified $La_{0.35}Sr_{0.65}TiO_3$ (y=20 at. %) electrode at T=750° C. vs. Pt/air in $H_2/H_2O/N_2$=77/3/20 (triangles, 1) and in $H_2/H_2O/N_2$=77/3/20 with 6 ppm $H_2S$ (diamonds, 2). Frequencies are marked.

Cerium-modified $La_{0.35}Sr_{0.65}TiO_3$ anode endurance to sulfur was verified by both a full cell (FIG. 20) and a half-cell (FIG. 21) test. As given in FIG. 20, 12 ppm hydrogen sulfide was introduced into the fuel gas, while drawing a current at V=0.5 Volts. As seen, no sulfur poisoning occurred after 30 hours of cell operating in this fuel gas. After that the hydrogen sulfide amount was increased to 26 ppm, and the cell was left, at first, also at V=0.5 Volt and then at the open-circuit voltage to total time in $H_2S$-containing atmosphere of over 70 hours. During that time the anode was exposed to 190 ppm $H_2S$ in nitrogen (with no hydrogen added) for about 10 minutes. When hydrogen again was supplied to the anode, the cell performance returned to the initial value. Thus, it is seen that the cerium-modified $La_{0.35}Sr_{0.65}TiO_3$ anode is tolerant (at least, for the time tested) to the presence of up to 190 ppm $H_2S$ in the fuel gas. Additionally, FIG. 21 illustrates the impedance spectra of the cerium-modified $La_{0.35}Sr_{0.65}TiO_3$ anode obtained in wet hydrogen before and during $H_2S$ added. As seen, both spectra coincide indicating no poisoning the anode with sulfur.

Example Five

Prophetic Example

Anode Compositions Including a Combination of Cerium and One or More Transition Metals as B-Site Dopant Alternative anode material compositions are made as described herein by modification of $La_{0.35}Sr_{0.65}TiO_3$ with a mixture comprising a combination of cerium and one or more transition metals, including Ni, Co, Fe, Cr, and Cu, to produce cerium-modified and transition-metal-modified $La_x Sr_{1-x}TiO_3$. Modified lanthanum-doped strontium titanate powders (x=0.1-0.4) are prepared by glycine/nitrate combustion method, as described above. After powder calcination at 1200° C. for 2 h, powders are attrition milled to reduce the average particle size to less than 0.5 μm, and electrode inks are prepared by mixing the powder with a commercial binder in a 3-roll mill as described above. In one example, the mixture includes at least about 5 mole % cerium and up to 95 mole % of one or more transition metals.

Example Six

Processing Anode Material Powders by Attrition Milling

Figure 22:
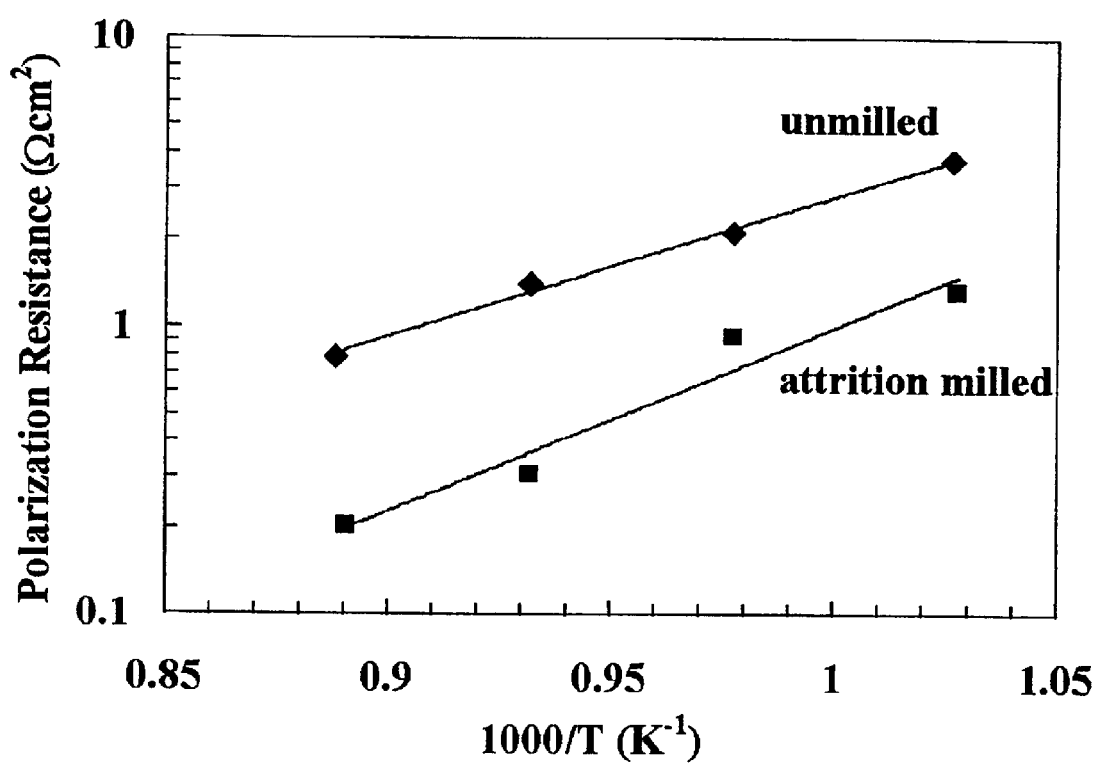
FIG. 22 is a plot showing Arrhenius plots for the area specific polarization resistance of cerium-modified $La_{0.35}Sr_{0.65}TiO_3$ (y=20 at. %) anodes consisted of the attrition milled and as-calcined powders in $H_2/H_2O$=97/3 vs. Pt/air.

The present inventors have also established that the initial powder processing of an anode material after calcining affects the anode performance. Up to a 4-fold increase in performance was achieved by using attrition milling to modify the particle size distribution (i.e., break up agglomerates and reduce average particle size), and, possibly, to achieve greater dispersion and homogenization of the cerium-containing phase, as shown in FIG. 22. At 700° C. in wet hydrogen a polarization resistance of 1.3 $\Omega cm^2$ was obtained.

While the invention has been illustrated and described in detail in the drawings and foregoing description, the same is to be considered as illustrative and not restrictive in character, it being understood that only selected embodiments have been shown and described and that all changes, equivalents, and modifications that come within the spirit of the invention described herein or defined by the following claims are desired to be protected. Any experiments, experimental examples, or experimental results provided herein are intended to be illustrative of the present invention and should not be considered limiting or restrictive with regard to the invention scope. Further, any theory, mechanism of operation, or finding stated herein is meant to further enhance understanding of the present invention and is not intended to limit the present invention in any way to such theory, mechanism or finding. All publications, patents, and patent applications cited in this specification are herein incorporated by reference as if each individual publication, patent, or patent application were specifically and individually indicated to be incorporated by reference and set forth in its entirety herein.

What is claimed is:
1. An integral solid oxide fuel cell for electrochemically reacting a fuel gas with an oxidant gas at an elevated temperature to produce a DC output voltage, said solid oxide fuel cell comprising:
   a layer of ceramic ion conducting electrolyte defining first and second opposing surfaces;
   a conductive anode layer in contact with the first surface of said electrolyte layer; and
   a conductive cathode layer in contact with the second surface of said electrolyte layer;
   wherein said electrolyte layer is disposed between said anode layer and said cathode layer;
   wherein said conductive anode layer comprises a cerium-modified doped strontium titanate material;
   wherein the cerium-modified doped strontium titanate material comprises an A-site dopant selected from the group consisting of lanthanum, scandium, yttrium and combinations thereof; and
   wherein cerium is present in the cerium-modified doped strontium titanate material in an amount of at least about 2 atomic percent.
2. The fuel cell in accordance with claim 1 wherein said cerium is present in the cerium-modified doped strontium titanate material in an amount of at least about 5 atomic percent.
3. The fuel cell in accordance with claim 1 wherein the A-site dopant comprises lanthanum.
4. The fuel cell in accordance with claim 3 wherein the cerium-modified doped strontium titanate material further comprises at least one member selected from the group consisting of nickel, cobalt, copper, chromium and iron.
5. The fuel cell in accordance with claim 1 wherein the cerium-modified doped strontium titanate has thermal expansion characteristics that correspond to thermal expansion characteristics of the electrolyte layer.
6. The fuel cell in accordance with claim 1 wherein the cerium-modified doped strontium titanate has a coefficient of thermal expansion of from about $8 \times 10^{-6}$ to about $13 \times 10^{-6}$ $K^{-1}$.
7. The fuel cell in accordance with claim 1 wherein the cerium-modified doped strontium titanate anode exhibits a polarization resistance of about 0.2 $\Omega cm^2$ at 850° C. and a polarization resistance of about 1.3 $\Omega cm^2$ at 700° C. in wet hydrogen versus Pt/air.
8. The fuel cell in accordance with claim 1 wherein the cerium-modified doped strontium titanate material is in contact with the electrolyte layer.
9. The fuel cell in accordance with claim 1 wherein the cerium-modified doped strontium titanate material comprises a layer having a thickness of at least 3 microns.
10. The fuel cell in accordance with claim 1 wherein the cerium-modified doped strontium titanate material comprises essentially the entire anode layer.
11. The fuel cell in accordance with claim 1 wherein the anode layer comprises a substantially homogenous mixture of a cerium-modified doped strontium titanate material and a finely-divided form of a second material.
12. A solid oxide fuel cell assembly for electrochemically reacting a fuel gas with a flowing oxidant gas at an elevated temperature to produce a DC output voltage, said assembly comprising a plurality of integral fuel cell units, each unit comprising a layer of ceramic ion conducting electrolyte disposed between and in contact with a conductive anode layer and a conductive cathode layer;
   wherein the anode layer of at least one of said fuel cells comprises a cerium-modified doped strontium titanate composition in contact with the electrolyte, wherein the cerium-modified doped strontium titanate material comprises an A-site dopant selected from the group consisting of lanthanum, scandium, yttrium and combinations thereof; and wherein cerium is present in the cerium-modified doped strontium titanate material in an amount of at least about 2 atomic percent.
13. The fuel cell assembly in accordance with claim 12, further comprising:
   a system for passing a gaseous fuel in contact with said anode layers and passing an oxidizing gas in contact with said cathode layers; and
   a system for utilizing electrical energy produced by said fuel cells.
14. A method for making a cerium-modified doped strontium titanate solid oxide fuel cell anode comprising:
   providing a cerium-modified strontium titanate material; and
   forming the cerium-modified strontium titanate material into an anode for a solid oxide fuel cell;
   wherein the cerium-modified strontium titanate material comprises an A-site dopant selected from the group consisting of lanthanum, scandium, yttrium and combinations thereof; and cerium in an amount of
   at least about 2 atomic percent; and wherein said forming comprises:
   mixing the cerium-modified strontium titanate material with a binder to provide an anode ink;
   applying the anode ink to a solid oxide electrolyte component; and
   sintering the anode ink.
15. The method in accordance with claim 14, further comprising, prior to said mixing, grinding the cerium-modified strontium titanate material to an average particle size of no greater than about 2 microns to provide a ground product.
16. The method in accordance with claim 14 wherein the cerium-modified strontium titanate material comprises an A-site dopant selected from the group consisting of lanthanum, scandium, yttrium and combinations thereof; and cerium in an amount of at least about 2 atomic percent; and wherein said forming comprises:
   forming an anode substrate having a thickness of at least about 50 microns; and
   applying a solid oxide layer to the anode substrate.
17. The method in accordance with claim 16, further comprising, prior to said forming, grinding the cerium-modified strontium titanate material to an average particle size of no greater than about 2 microns to provide a ground product.
18. A method for producing electrical energy, comprising:
   providing a solid oxide fuel cell, the solid oxide fuel cell including a layer of ceramic ion conducting electrolyte defining first and second opposing surfaces; a conductive anode layer in contact with the first surface of said electrolyte layer; and a conductive cathode layer in contact with the second surface of said electrolyte layer; wherein said electrolyte layer is disposed between said anode layer and said cathode layer; wherein said conductive anode layer comprises a cerium-modified doped strontium titanate material; wherein the cerium-modified doped strontium titanate material comprises an A-site dopant selected from the group consisting of lanthanum, scandium, yttrium and combinations thereof; and wherein cerium is present in the cerium-modified doped strontium titanate material in an amount of at least about 2 atomic percent;
   causing air or other oxidizing gas to flow in contact with the cathode layer; and causing a fuel gas to intermittently flow in contact with the anode layer to provide electrical energy;
wherein the intermittent flow of the fuel gas includes periods of fuel flow separated by at least one period during which the flow of the fuel is interrupted and the anode layer is exposed to an oxidizing atmosphere.

19. A method for producing electrical energy, comprising:
providing a solid oxide fuel cell, the solid oxide fuel cell including a layer of ceramic ion conducting electrolyte defining first and second opposing surfaces; a conductive anode layer in contact with the first surface of said electrolyte layer; and a conductive cathode layer in contact with the second surface of said electrolyte layer; wherein said electrolyte layer is disposed between said anode layer and said cathode layer; wherein said conductive anode layer comprises a cerium-modified doped strontium titanate material; wherein the cerium-modified doped strontium titanate material comprises an A-site dopant selected from the group consisting of lanthanum, scandium, yttrium and combinations thereof; and wherein cerium is present in the cerium-modified doped strontium titanate material in an amount of at least about 2 atomic percent;
causing air or other oxidizing gas to flow in contact with the cathode layer; and
causing a fuel gas to flow in contact with the anode layer to provide electrical energy;
wherein the fuel includes a carbon-containing gas; and
wherein the fuel cell produces electrical energy for a period of at least one hour.

20. A method for producing electrical energy, comprising:
providing a solid oxide fuel cell, the solid oxide fuel cell including a layer of ceramic ion conducting electrolyte defining first and second opposing surfaces; a conductive anode layer in contact with the first surface of said electrolyte layer; and a conductive cathode layer in contact with the second surface of said electrolyte layer; wherein said electrolyte layer is disposed between said anode layer and said cathode layer; wherein said conductive anode layer comprises a cerium-modified doped strontium titanate material; wherein the cerium-modified doped strontium titanate material comprises an A-site dopant selected from the group consisting of lanthanum, scandium, yttrium and combinations thereof; and wherein cerium is present in the cerium-modified doped strontium titanate material in an amount of at least about 2 atomic percent;
causing air or other oxidizing gas to flow in contact with the cathode layer; and
causing a fuel gas to flow in contact with the anode layer to provide electrical energy;
wherein the fuel is a sulfur-bearing fuel; and
wherein the fuel cell produces electrical energy for a period of at least one hour.

* * * * *